United States Patent
Fujita et al.

(10) Patent No.: US 6,474,777 B1
(45) Date of Patent: Nov. 5, 2002

(54) PRINTING METHOD AND A PRINTING APPARATUS

(75) Inventors: Miyuki Fujita, Tokyo; Yuji Konno; Tetsuhiro Maeda, both of Kawasaki, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/640,378

(22) Filed: Aug. 17, 2000

(30) Foreign Application Priority Data

Aug. 24, 1999 (JP) .......................................... 11-237298

(51) Int. Cl.⁷ ............................................... B41J 2/145
(52) U.S. Cl. ............................ 347/41; 347/16; 347/43
(58) Field of Search .............................. 347/41, 15, 43, 347/12, 14, 16, 40

(56) References Cited

U.S. PATENT DOCUMENTS

| | | | |
|---|---|---|---|
| 5,633,663 A | 5/1997 | Matsubara et al. ............ | 347/41 |
| 5,805,183 A | * 9/1998 | Lidke et al. .................... | 347/41 |
| 5,831,642 A | 11/1998 | Matsubara et al. ............ | 347/9 |
| 6,003,970 A | 12/1999 | Fujita et al. ................... | 347/41 |
| 6,020,976 A | 2/2000 | Fujita et al. ................... | 358/1.3 |
| 6,025,928 A | 2/2000 | Takemura et al. ............. | 358/1.3 |
| 6,042,212 A | 3/2000 | Takahashi et al. ............. | 347/15 |
| 6,102,520 A | * 8/2000 | Terasawa ....................... | 347/43 |
| 6,106,102 A | * 8/2000 | Richtsmeier et al. .......... | 347/41 |
| 6,250,734 B1 | * 6/2001 | Otsuki ........................... | 347/16 |
| 6,273,549 B1 | * 8/2001 | Wetchler et al. ............... | 347/43 |

FOREIGN PATENT DOCUMENTS

| | | | |
|---|---|---|---|
| EP | 0 564 252 | 10/1993 | |
| EP | 0 863 480 | 9/1998 | |
| JP | 58-194541 | 11/1983 | ............... B41J/3/00 |
| JP | 63-038309 | 2/1988 | ............ H03B/9/12 |
| JP | 5031921 | 2/1993 | |
| JP | 5031922 | 2/1993 | ............... B41J/2/21 |
| JP | 6022106 | 1/1994 | ............ H04N/1/23 |
| JP | 7052390 | 2/1995 | ............... B41J/2/07 |

* cited by examiner

Primary Examiner—Lamson Nguyen
(74) Attorney, Agent, or Firm—Fitzpatrick, Cella, Harper & Scinto

(57) ABSTRACT

To make it possible to print a smooth image without color irregularity at a high speed by a printing apparatus using a color ink-jet head provided with plural arrays of ink ejection openings side by side in the direction of the main scanning corresponding to different color inks, moving this head to scan reciprocally, and also adopting a multi-pass printing method for divided printing on a certain area by scanning at plural times with the color ink-jet head. In the multi-pass printing using the color ink-jet head, an ink firstly landed on a certain area determines a prioritized color influential on the color tone. Moreover, a printing medium is largely covered by a first two-pass printings. Namely, if it is possible to suppress the color irregularity in the first two passes, a harmful influence on a whole image by the color irregularity can remarkably reduced, therefore, the first pass data printing ratio to the area is set smaller than that of the second pass and thereafter.

26 Claims, 26 Drawing Sheets

| | | | | | |
|---|---|---|---|---|---|
| 1ST PASS DATA PRINTING RATIO (%) | 12.5 | 11 | 10 | 9 | 8 |
| 2ND PASS DATA PRINTING RATIO (%) | 12.5 | 14 | 15 | 16 | 17 |
| 1ST PASS DOT COVERING RATIO (CALCULATED) | 0.45 | 0.40 | 0.36 | 0.32 | 0.29 |
| 2ND PASS DOT COVERING RATIO (CALCULATED) | 0.25 | 0.30 | 0.34 | 0.37 | 0.41 |
| IMAGE EVALUATION RESULT | × | ○ | ◎ | ○ | △ |

FIG.12

| COLLECTIVE DOT | (pixel×pixel) | 1×1 | 4×1 | 4×2 | 4×4 | 10×10 |
|---|---|---|---|---|---|---|
| COLLECTIVE DOT AREA | ($\mu m^2$) | 1590 | 4724 | 7496 | 13148 | 67,367 |
| 1ST PASS PRINTING RATIO | (%) | 14 | 16 | 18 | 19 | 20 |
| 2ND PASS PRINTING RATIO | (%) | 36 | 34 | 32 | 31 | 30 |

FIG.16

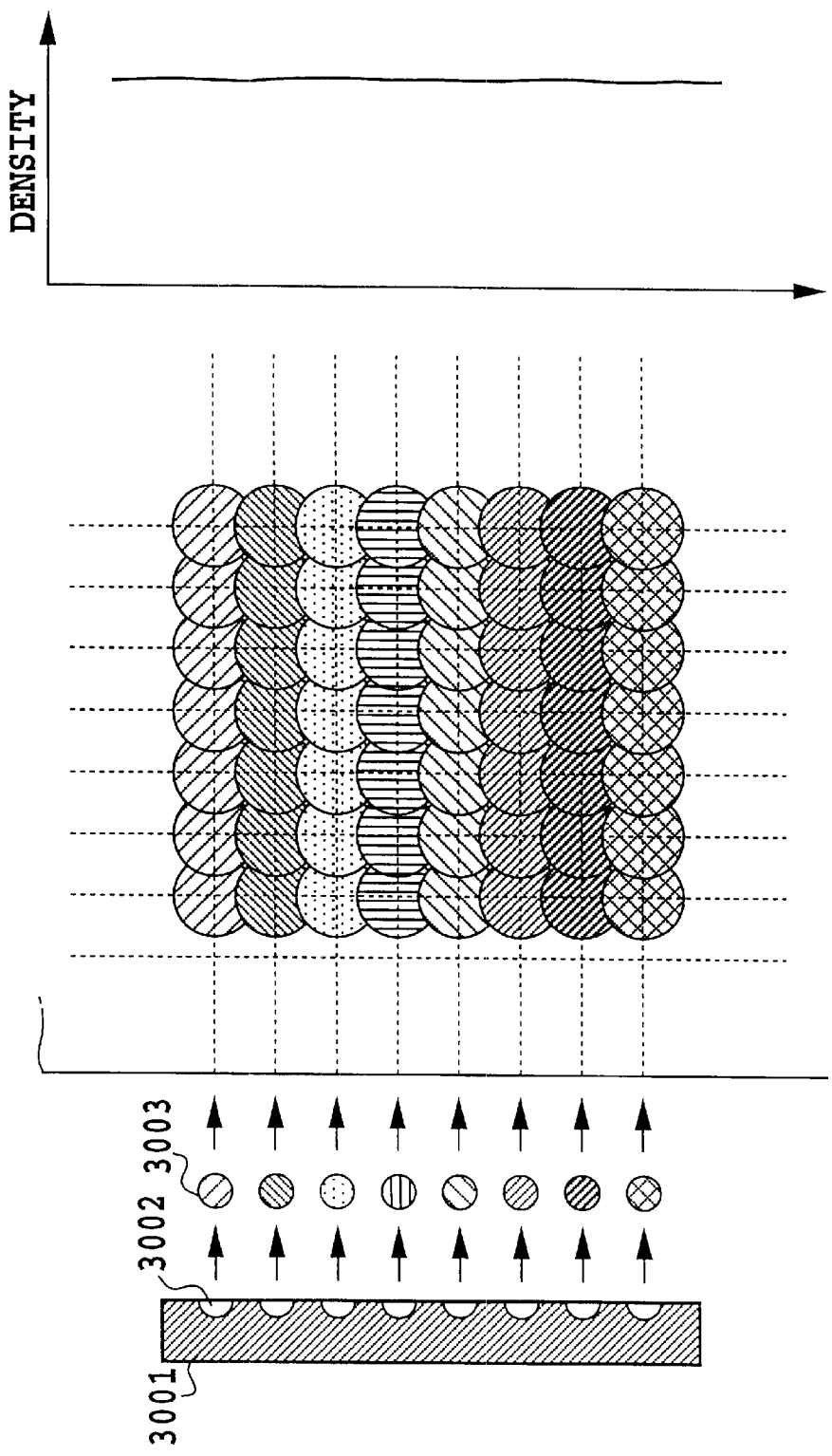

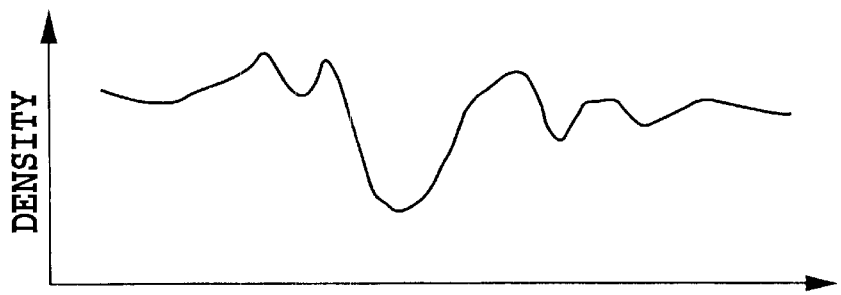
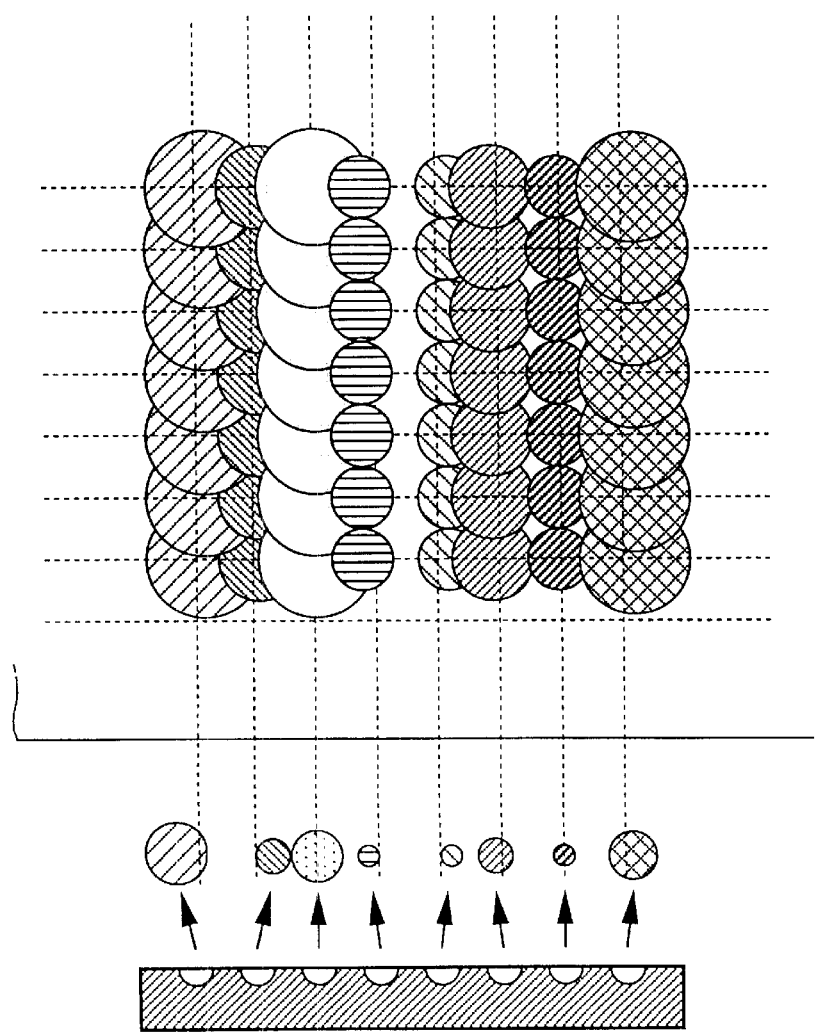
FIG.20C
FIG.20B
FIG.20A

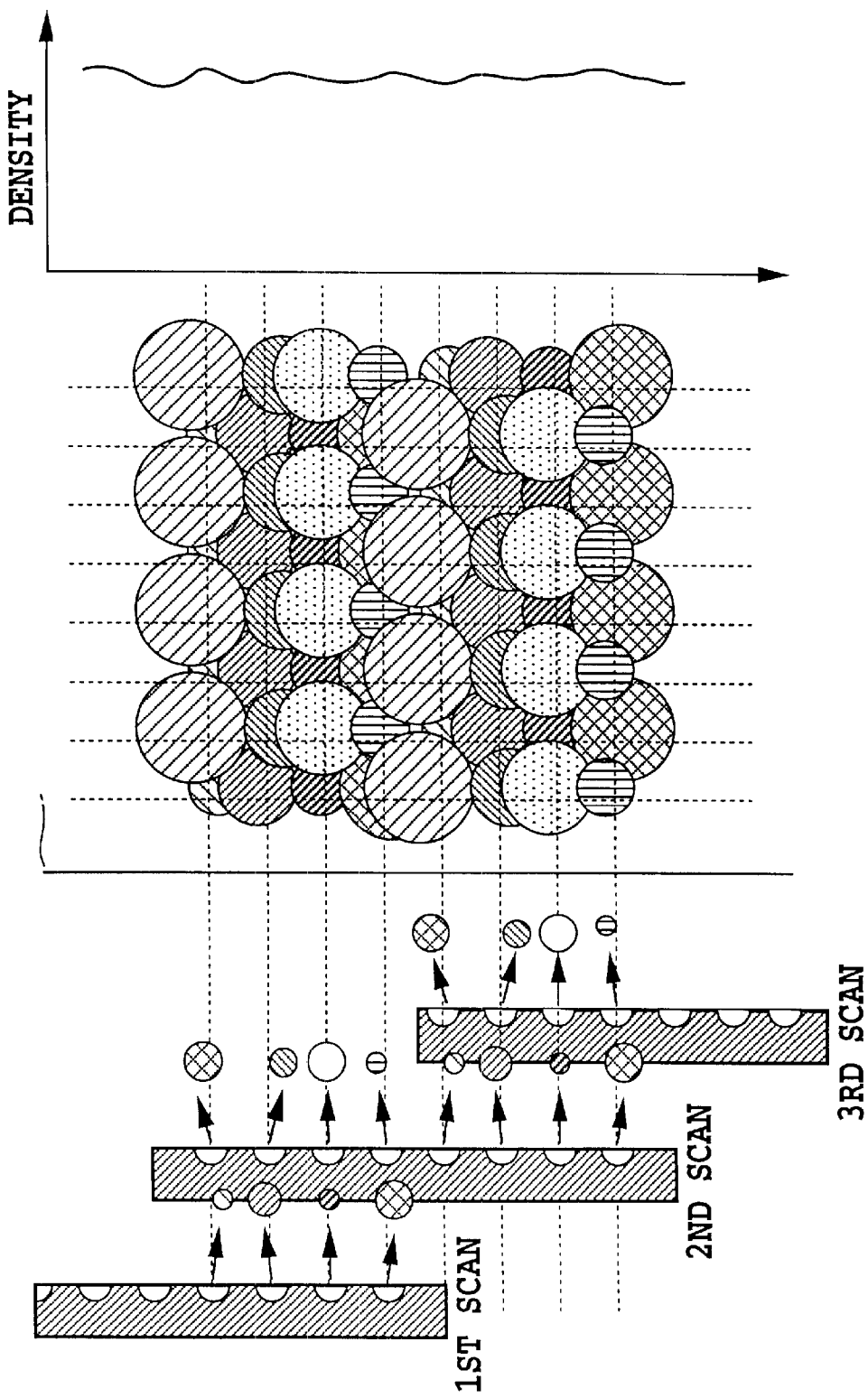

PRINTING METHOD AND A PRINTING APPARATUS

This application is based on Japanese Patent Application No. 11-237298 filed on Aug. 24, 1999, the content of which is incorporated hereinto by reference.

BACKGROUND OF THE INVENTION

1. Field of the Invention

The present invention relates to a printing method and a printing apparatus, and is particularly suited for adjusting the positions of ink dots in a printing apparatus of an ink jet system. In addition to general printing apparatus, the present invention can also be applied to copying machines, facsimiles with a communication system, word processors with a printer, and industrial printing apparatus combined with a variety of processing devices.

2. Description of the Related Art

An image printing apparatus of so-called serial scan type, which executes the print operation while scanning a print head, or a printing unit, over a print medium, has found a variety of image forming applications. The ink jet printing apparatus in particular has in recent years achieved high resolution and color printing, making a significant image quality improvement, which has resulted in a rapid spread of its use. Such an apparatus employs a so-called multi-nozzle head that has an array of densely arranged nozzles for ejecting ink droplets. Images with still higher resolution has now been made possible by increasing the nozzle density and reducing the amount of ink per dot. Further, to realize an image quality approaching that of silver salt picture, various technologies have been developed, including the use of pale or light color ink with reduced density in addition to. four basic color inks (cyan, magenta, yellow and black). A print speed reduction problem, which is feared to arise as the picture quality advances, is dealt with by increasing the number of print elements, improving the drive frequency and employing a bi-directional printing technique, thus realizing a satisfactory throughput.

FIG. 17 schematically shows a general construction of a printer that uses the multi-nozzle for printing. In the figure, reference number 1901 represents head cartridges corresponding to four inks, black (K), cyan (C), magenta (M) and yellow (Y). Each head cartridge 1901 consists of an ink tank 1902T filled with a corresponding color ink and a head unit 1902H having an array of many nozzles for ejecting the ink supplied from the ink tank onto a print medium 1907.

FIG. 18 schematically shows the head unit 1902H in the Z direction for illustrating representing the nozzle array thereof. In this example, ejection openings 2001 are arrayed in one line.

In FIG. 17, designated 1903 is a paper feed roller which, in cooperation with an auxiliary roller 1904, clamps a print medium (print paper) 1907 and rotates in the direction of arrow in the figure to feed the print paper 1907 in the Y direction as required. Denoted 1905 is a pair of paper supply rollers that clamp the print paper 1907 and carries it toward the print position. The paper supply rollers 1905 also keep the print paper 1907 flat and tight between the supply rollers and the feed rollers 1903, 1904.

Designated 1906 is a carriage that supports the four head cartridges 1901 and moves them in a main scan direction during the print operation. When the printing is not performed or during an ink ejection performance recovery operation for the head unit 1902H, the carriage 1906 is set at a home position H indicated by a dotted line.

The carriage 1906, which was set at the home position h before the print operation, starts moving in the X direction upon reception of a print start command and at the same time the head unit 1902H ejects ink from a plurality of nozzles (n nozzles) formed therein according to print data to perform printing over a band of a width corresponding to the length of the nozzle array. When the printing is done up to the X-direction end of the print paper 1907, the carriage 1906 returns to the home position h in the case of one-way printing and resumes printing in the X direction. In the case of bi-directional printing, the carriage 1906 also performs printing while it is moving in a -X direction toward the home position h. In either case, after one print operation (one scan) in one direction has been finished before the next print operation is started, the paper feed roller 1903 is rotated a predetermined amount in the direction of arrow in the figure to feed the print paper 1907 in the Y direction a predetermined distance (corresponding to the length of the nozzle array). By repeating the one-scan print operation and the print paper feeding by a predetermined distance, data for one sheet of paper is printed.

Unlike a monochromatic printing that prints only characters such as letters, numbers and symbols, the color image printing must meet various requirements such as color development, grayscale characteristic and uniformity. As to the uniformity in particular, slight variations among individual nozzles that are produced during the manufacture of a multi-nozzle head formed integrally with many nozzles (in this specification the nozzle generally refers to an ejection opening, a liquid passage communicating with the ejection opening and an element for generating energy used to eject ink) influence the amounts of ink ejected from the individual nozzles and the directions of ink ejection during printing and eventually degrade the image quality in the form of density variations of the printed image.

Detailed examples will be explained by referring to FIGS. 19A–19C, 20A–20C and 21A–21C. In FIG. 19A, designated 3001 is a multi-nozzle head with a construction similar to the one shown in FIG. 18, which is shown to have only eight nozzles 3002 for simplicity. Denoted 3003 are ink droplets ejected from the nozzles 3002. It is ideal that the ink droplets are ejected in equal amounts and in the same direction. If ink ejection is done in this manner, ink dots of equal sizes land on the print medium, as shown in FIG. 19B, resulting in a uniform density distribution with no unevenness in density (FIG. 19C).

In reality, however, individual nozzles have their own variations and if the printing is done in a manner described above, the ink droplets ejected from individual nozzles vary in size and direction as shown in FIG. 20A, forming ink dots on the paper surface as shown in FIG. 20B. From this figure it is seen that a blank part appears cyclically in the head main scan direction, dots overlap excessively in other parts, or a white line occurs at the central part in the figure. The ink dots printed in this way produce a density distribution in the direction of nozzle arrangement or nozzle column as shown in FIG. 20C, which is perceived as unevenness in density by normal human eye.

To deal with the problem of the unevenness in density, the following method has been proposed.

This method will be explained by referring to FIGS. 21A to 21C. Although the head 3001 is scanned three times as shown in FIG. 14A to complete the print in an area similar to that shown in FIGS. 19A–19C and FIGS. 20A–20C, an area of four pixels. one-half the vertically arranged eight pixels, is completed with two scans (passes). In this case, the eight nozzles of the head 3001 is divided into two halves, upper four nozzles and lower four nozzles, and the number of dots formed by one nozzle in one scan is equal to the image data culled to one-half according to a predetermined image data arrangement. During the second scan, dots are embedded at the remaining half of the image data to complete the print in the four-pixel area. This method of printing is called a multi-pass printing method. With this printing method, if a print head similar to the one shown in FIG. 20A is used, the individual nozzle influence on the printed image is halved, so that the printed image will be as shown in FIG. 21B, rendering the white lines or dark lines shown in FIG. 20B less noticeable. Hence, the unevenness in density is significantly improved as shown in FIG. 21C when compared with FIG. 20C.

While the same print area has been described to be completed in two scans, the multi-pass printing improves the image quality as the number of passes increases. This however elongates the print time, which means that there is a trade-off relation between the image quality and the print time.

Under such a situation, there have already been various proposals for the purpose how speedily and beautifully an image can be outputted. Japanese Patent Application Laid-open No. 5-31922 (1993) discloses such contents that an image data arrangement. by a tone production method such as a dither method are masked by applying a thinning pattern with dot arrangement asynchronous with the image data arrangement. According to this Application, a data printing ratio is made equal in plural passes as far as possible to obtain a smooth image by using a mask pattern which does not synchronized with a predetermined dither pattern. However, although this method has been able to cope with the predetermined dither pattern for the purpose, it has been difficult to equally cope with all the binarization methods.

Moreover, Japanese Patent Application Laid-open No. 7-52390 (1995) discloses a printing method using a mask pattern provided with randomness. According to this method, the principal object in a divided printing, i.e., improvement in unevenness of an image caused by connecting parts and variation in nozzles is possible to any binarization method.

The above-mentioned divided printing has had a problem that time and cost required for printing a sheet of paper increases as the number of division increases, and the throughput of printing decreases. To improve this problem, reduction in printing time can be considered by carrying out printing in the process of reciprocal scanning of a carriage (bi-directional printing). According to this method, since all carriage scanning operations made to return to the home position without printing anything are omitted, a printing time for a sheet of paper can be reduced approximately by half. And, in practice, the bi-directional printing has frequently been adopted as a printing method of a monochrome image.

However, in a color ink-jet printing apparatus, it has been difficult to realize bi-directional printing due to the below described factors.

FIGS. 22A and 22B show a state in which dots of a printing ink widely used at present are landed on a printing medium (paper) P, and here, the figures show the case where ink dots of different colors are absorbed (printed) at almost adjoining positions at a time interval. Here, it should be noted that in the overlapped part of the two dots, the ink dot landed later sinks into the paper deeper than the ink dot landed earlier. This fact is for the following reason. Namely, since bonding between the printing medium and a coloring matter is limited at the stage when the coloring matter such as dyestuff in the ejected ink is physically and chemically bonded to the printing medium, and the bonding between the coloring matter in the precedingly ejected ink and the printing medium is prioritized, the ink coloring matter remains on the surface of the printing medium more than the following one, so far as coloring matters do not differ much in the bonding strengths depending on the kinds. Therefore, it is thought that the ink coloring matter subsequently landed is hard to be bonded to the surface of the printing medium, and sinks in the paper in the depth direction to dye and bond it. In this case, even though two kinds of inks are landed at the same position, their colors are prioritized according to the landing order, and result in representing two different colors to visual characteristic of human eyes.

In the construction shown in FIG. 17, the four color heads 1901, which are arranged in order of black (K), cyan (C), magenta (M), and yellow (Y) from the right in this figure, move to the right as shown by the x-coordinate from the printing start position shown in the figure in the forward scanning, and perform printing operation by ejecting each ink in the moving process. Since the order of printing on the paper is in accordance with that of the above-mentioned arrangement in this case, for example, when a signal of green (cyan+yellow) is inputted for a certain area, the inks are absorbed in each pixel in order of cyan and yellow. Therefore, the cyan absorbed precedently is the prioritized color in this scanning, and green dots with a cyan tone are formed. On the other hand, in the return or backward scanning after the paper has been fed in the direction of y-coordinate, the four color heads are positioned at the right side in the figure, and then perform printing operation while moving in the reverse direction of the forward way. Therefore, the landing order is also inverted, and green dots with a yellow tone are formed in this scanning.

If scanning for printing is repeated as the above, a green dot area with a cyan tone and a green dot area with a yellow tone are alternately formed in the sub-scanning direction (y-direction) according to the forward and backward printings with the printing heads. Namely, if print-scanning is carries out without considering the divided printing and the paper is fed by an amount of the y-directional head width between the forward and backward scans, the green area with a cyan tone and the green area with a yellow tone are alternately repeated at each head width in the y direction, and this causes deterioration in quality of the green image which should be even.

However, it is possible to overcome this harmful influence a little by using the divided printing method already described above. Namely, although green dots with a cyan tone are printed in the forward scanning and green dots with a yellow tone are printed in the backward scanning, even if the divided printing is performed, the paper is fed by an amount smaller than the head width between the forward and backward scans, therefore, a color tone in a certain area contains a mixture of both tones of dots, and this relaxes unevenness of color.

These constructions and effects have already been disclosed in U.S. Pat. No. 4,748,453. This invention describes such effects that although a paper feed amount is not restricted, ink is prevented from beading on a medium such as a plastic sheet for an OHP by performing supplementary printing to the pixels alternately positioned in the horizontal and vertical directions in the printing area by printing divided into the first and second (or more) scans, and that when a color image is formed, color-banding (unevenness of color) can be prevented by inverting the landing order of the inks at mixed color pixels in the first and second scans (forward and backward printing). Since it is the principal object of the invention of the above-mentioned Patent to prevent beading between each pixel, it is characterized that each pixel printed in a single scanning is alternate in the horizontal and vertical directions (not adjoining each other).

On the other hand, according to Japanese Patent Application Laid-open No. 58-194541 (1983) applied by the applicant of the present invention, such a printing method is disclosed that when plural arrays of printing elements are arranged in parallel and main scanning of dot matrix printing is carried out by moving them forward and backward in the direction perpendicular to the array of printing elements, the duplicate printing dots by said plural arrays of printing elements have been made to differ in order of the duplicate printing on the forward and backward ways of said main scanning from each other, by intermittently printing the smaller number of dots than the entire dots to be printed at least in either of each row or column of the printing dot matrix in the forward main scanning, and intermittently printing the remaining dots in either of each row or column of the printing dot matrix in the backward main scanning. This Application does not describe either about restriction to reduce a paper feed amount smaller than a normal one as in the divided printing mentioned above, but describes, as an effect, about prevention of image deterioration caused by color tone irregularity (color banding) of a printed image based on the duplicate printing with the color inks. Moreover, since it is the principal object in the invention of the Application to prevent this color tone irregularity, no special restriction is described on dot positions to be printed in each scanning, but horizontal thinning in which dots are alternately printed only in the vertical direction and vertical thinning in which dots are printed alternately only horizontal direction are described, in addition to a checker pattern printing.

Moreover, the Japanese Patent Publication No. 63-38309 (1988) also discloses that, although this Publication is not restricted to a color printer, a construction for performing back-and-forward printing using a diced form (checker pattern) is disclosed. An object of the invention in the Publication is to prevent adjoining dots from being successively printed and to prevent dot-distortion from occurring by avoiding printing an adjacent dot before the printed dot is dried. Therefore, according to this invention, similarly to the above-mentioned U.S. Pat. No. 4,748,453, the thinning-out mask is restricted to a diced form (checker pattern).

However, even though the divided printing is performed according to the checker pattern disclosed in the Publication, the harmful influence of color irregularity is not completely solved yet.

The reason for the above will be explained below by referring to FIGS. 23A to 23C, and 24. Usually, an ink droplet quantity is designed so as to spread larger than an area given to each pixel on the paper. This is for the purpose of completely blinding a white part (ground of a printing medium) of the paper to an area of 100% data printing ratio. Therefore, when a two-divided printing is performed, a pixel itself is printed only 50% by a single scanning, but almost 100% area of the printing medium (printing paper) is covered.

FIGS. 23A and 23B show the cross sections in this case. Here, they show that the first pass (forward scanning) provides a checker pattern printing, and the second pass (backward scanning) provides an inverted checker pattern.

FIG. 23A shows the appearances of inks directly after printing in the first pass (forward scanning), and the part fully painted out is printed with cyan ink, and the shaded portion is printed with yellow ink. Since the yellow ink is landed at the same position as the cyan ink at a slight time interval, when they are absorbed in the paper, the cyan ink blurs little and the density stays high, while the yellow ink goes under and around the cyan ink, to blur large, and the density becomes low. Moreover, the absorption of these inks extends to the adjacent pixels in this case, so that the paper surface is almost filled with the inks (FIG. 23B).

In the second pass printing (backward scanning) performed under this condition, the inks are landed on the spot where the adjoining inks are already absorbed. Since the second pass is a backward scanning, the yellow ink is landed before the cyan ink (FIG. 23B). When the inks are absorbed as they are, such an absorption state is brought as both colors does not appear much on the surface in the end as shown in FIG. 23C. And, as a finally completed image, the cyan density of the first printing is emphasized most strongly, and this printing area is provided with a green image with emphasis on cyan. Contrariwise, in the printing area provided with the first pass printing by the backward scanning and adjacent to the above-mentioned printing area, the cyan and the yellow are inverted, so that a green image is obtained with a yellow tone prioritized.

FIG. 24 shows the printed states of the above. two printing areas, representing the case in which forward and backward printing was carried out by using a multi-nozzle head with 16 nozzles according to the method described in FIGS. 21A to 21C. From this figure, it can be seen that a precedent half of the head always determines a prioritized color for each area of an eight-dot width. and that the prioritized colors are inverted from each other in forward and backward scanning. Although the description has been made here assuming that a checker patterned mask was applied, a random mask printing method disclosed in the before-mentioned Japanese Patent Application Laid-open No. 7-52390 (1995) has brought a similar result, and since two areas with different prioritized colors existed alternately, color irregularity has still appeared also in divided printing and deteriorated an image, and a bi-directional printing has been made difficult.

As a solution of the harmful effect of the above-described color irregularity, the invention disclosed in Japanese Patent Application Laid-open No. 6-22106 (1994) is mentioned. According to this invention, a group of m×n pieces of pixels is used as a unit for printing, and printing is performed by using an arranging matrix in which the groups are not adjacent to each other. The Application discloses such an effect as an amount swelling out to a blank paper area has been reduced by printing a batch of m×n pieces of pixels, and a difference between prioritized colors in forward and backward printings has been eliminated to reduce the harmful effect of color irregularity.

However, the technique disclosed by the above-described Japanese Patent Application Laid-open No. 6-22106 (1994) has not suited for printing a high quality photographic tone image which is required nowadays. The reason is that a batch of gathered dots unit for a sufficient effect of controlling color irregularity exceeds a degree of human visual resolution, so that a texture becomes visually conformable. Namely, although the invention has been able to fully cope with a desktop publishing, and a printing for images consist of graphics or text, it could be harmful to a photographic image quality which is in great demand in recent years. Therefore, under the existing circumstances, it is general to cope with the problem by applying a random mask printing method with increasing the number of divided printing, however, when bi-directional printing is carried out to increase a throughput, color irregularity still remains to some extent and the problem is still not fully coped with.

SUMMARY OF THE INVENTION

The present invention is made considering the above-mentioned problem, and the purpose is to make it possible to form a high quality image at a high speed, namely, to make it possible to print a photographic image without color irregularity at a high speed.

In a first aspect of the present invention, there is provided a printing method using a print head on which a plurality of ejection openings for ejecting inks are arranged, the method comprising the steps of:

moving the print head to scan in forward and backward directions different from the arranging direction of the plurality of ejection openings, also relatively transporting the printing medium in the direction perpendicular to the scan directions by the quantities less than the arranging width of the plurality of ejection openings, and forming an image on the printing medium by the forward and backward scans at plural times in accordance with pixel arrangements in a complementary relation to the same image area; and making the sum of ratios of the data print quantity in the odd-numbered scans among the plural times of the forward and backward scans to the total data print quantity to the same image area, smaller than the sum of ratios of the data print quantity in the even-numbered scans among the plural times of the forward and backward scans, during the forming of image.

In a second aspect of the present invention, there is provided a printing apparatus using a print head on which a plurality of ejection openings for ejecting inks are arranged, the apparatus comprising:

means for moving the print head to scan in forward and backward directions different from the arranging direction of the plurality of ejection openings, also relatively transporting the printing medium in the direction perpendicular to the scan directions by the quantities less than the arranging width of the plurality of ejection openings, and forming an image on the printing medium by the forward and backward scans at plural times in accordance with pixel arrangements in a complementary relation to the same image area; and means for making the sum of ratios of the data print quantity in the odd-numbered scans among the plural times of the forward and backward scans to the total data print quantity to the same image area, smaller than the sum of ratios of the data print quantity in the even-numbered scans among the plural times of the forward and backward scans, during the forming of image.

In the first or second aspect of the present invention, the ratio of the data print quantity in a first scan may be made smaller than the ratio of the data print quantity in a second scanning, among the plural times of the forward and backward scans.

The scans may be carried out three times or more to the same image area, and the ratio of the data print quantity in a third scan and thereafter may be made larger than the ratio of the data print quantity in a first scan and smaller than the ratio of the data print quantity in a second scan.

Here, the sum of covering ratios of the printing medium by formed dots in the first scan and the second scans may be made larger than 50%.

In the above, the print head may have plural arrays of the plurality of ejection openings side by side in the scan directions corresponding to inks with different color tones.

The pixel arrangement in at least a first scanning among the plural times of the forward and backward scans may be specified in a unit of m×n (n, m: integer) pixels.

In a third aspect of the present invention, there is provided a printing method using a print head on which a plurality of ejection openings for ejecting inks are arranged, the method comprising the steps of:

moving the print head to scan in forward and backward directions different from the arranging direction of the plurality of ejection openings, also relatively transporting the printing medium in the direction perpendicular to the scan directions by the quantities less than the arranging width of the plurality of ejection openings, and forming an image on the printing medium by the forward and backward scans at plural times in accordance with pixel arrangements in a complementary relation to the same image area; and making a ratio of the data print quantity in a first scan among the plural times of the forward and backward scans to the total data print quantity to the same image area smaller than a ratio of the data print quantity in a second scanning, and making the sum of covering ratios of the printing medium by formed dots in the first scan and the second scans larger than 50%, during the forming of image.

In a fourth aspect of the present invention, there is provided a printing apparatus using a print head on which a plurality of ejection openings for ejecting inks are arranged, the apparatus comprising:

means for moving the print head to scan in forward and backward directions different from the arranging direction of the plurality of ejection openings, also relatively transporting the printing medium in the direction perpendicular to the scan directions by the quantities less than the arranging width of the plurality of ejection openings, and forming an image on the printing medium by the forward and backward scans at plural times in accordance with pixel arrangements in a complementary relation to the same image area; and means for making a ratio of the data print quantity in a first scan among the plural times of the forward and backward scans to the total data print quantity to the same image area smaller than a ratio of the data print quantity in a second scanning, and making the sum of covering ratios of the printing medium by formed dots in the first scan and the second scans larger than 50%, during the forming of image.

In the third or fourth aspect of the present invention, the covering ratios on the printing medium by formed dots in the first scan and the second scan may be substantially equalized.

In a fifth aspect of the present invention, there is provided a printing method using a print head on which a plurality of ejection openings for ejecting inks are arranged, the method comprising the steps of:

moving the print head to scan in forward and backward directions different from the arranging direction of the plurality of ejection openings, also relatively transporting the printing medium in the direction perpendicular to the scan directions by the quantities less than the arranging width of the plurality of ejection openings, and forming an image on the printing medium by the forward and backward scans at plural times in accordance with pixel arrangements in a complementary relation to the same image area;

a first control step of making the sum of ratios of the data print quantity in the odd-numbered scans among the plural times of the forward and backward scans to the total data print quantity to the same image area, smaller than the sum of ratios of the data print quantity in the even-numbered scans among the plural times of the forward and backward scans, during the forming of image; and a second control step of performing a control similar to the first control step except for making the number of the plural times of the forward and backward scans less than in the first control step, and also specifying the pixel arrangement at least in a first scan among the plural times of the forward and backward scans in a unit of m×n (n, m: integer) pixels.

In a sixth aspect of the present invention, there is provided a printing apparatus using a print head on which a plurality of ejection openings for ejecting inks are arranged, the apparatus comprising:

means for moving the print head to scan in forward and backward directions different from the arranging direction of the plurality of ejection openings, also relatively transporting the printing medium in the direction perpendicular to the scan directions by the quantities less than the arranging width of the plurality of ejection openings, and forming an image on the printing medium by the forward and backward scans at plural times in accordance with pixel arrangements in a complementary relation to the same image area;

a first mode for making the sum of ratios of the data print quantity in the odd-numbered scans among the plural times of the forward and backward scans to the total data print quantity to the same image area, smaller than the sum of ratios of the data print quantity in the even-numbered scans among the plural times of the forward and backward scans, during the forming of image; and a second mode for performing a control similar to the first mode except for making the number of the plural times of the forward and backward scans less than in the first mode, and also specifying the pixel arrangement at least in a first scan among the plural times of the forward and backward scans in a unit of m×n (n, m: integer) pixels.

In the fifth or sixth aspect of the present invention, switching between the first and second control steps or modes may be possible.

In the above, the print head may have heating elements to generate thermal energy for causing film boiling in ink as an energy for ejecting ink from the ejection openings.

The above and other objects, effects, features and advantages of the present invention will become more apparent from the following description of embodiments thereof taken in conjunction with the accompanying drawings.

BRIEF DESCRIPTION OF THE DRAWINGS

FIG. 12 shows an evaluation result of color irregularity in the case of the experiment performed by varying a data printing ratio of the first and second passes in 1% steps according to a multi-pass printing method;

FIG. 16 shows a table for explaining the effect of the second embodiment of the present invention;

FIGS. 19A to 19C are explanatory diagrams showing a state in which an ideal ink jet printing is performed;

FIGS. 20A to 20C are explanatory diagrams showing a state in which density unevenness occurs during the ink jet printing;

FIGS. 21A to 21C are explanatory diagrams showing a principle of a multi-pass printing for preventing density unevenness explained in FIG. 20;

DESCRIPTION OF THE PREFERRED EMBODIMENTS

Embodiments of the printing apparatus according to the present invention will be described by referring to the accompanying drawings.

In the following description we take up as an example a printing apparatus using an ink jet printing system.

In this specification, a word "print" (or "record") refers to not only forming significant information, such as characters and figures, but also forming images, designs or patterns on printing medium and processing media, whether the information is significant or insignificant or whether it is visible so as to be perceived by humans.

The word "print medium" or "print sheet" include not only paper used in common printing apparatus, but cloth, plastic films, metal plates, glass, ceramics, wood, leather or any other material that can receive ink. This word will be also referred to "paper".

Further, the word "ink" (or "liquid") should be interpreted in its wide sense as with the word "print" and refers to liquid that is applied to the printing medium to form images, designs or patterns, process the printing medium or process ink (for example, coagulate or make insoluble a colorant in the ink applied to the printing medium).

1. Apparatus Body

Figure 1:
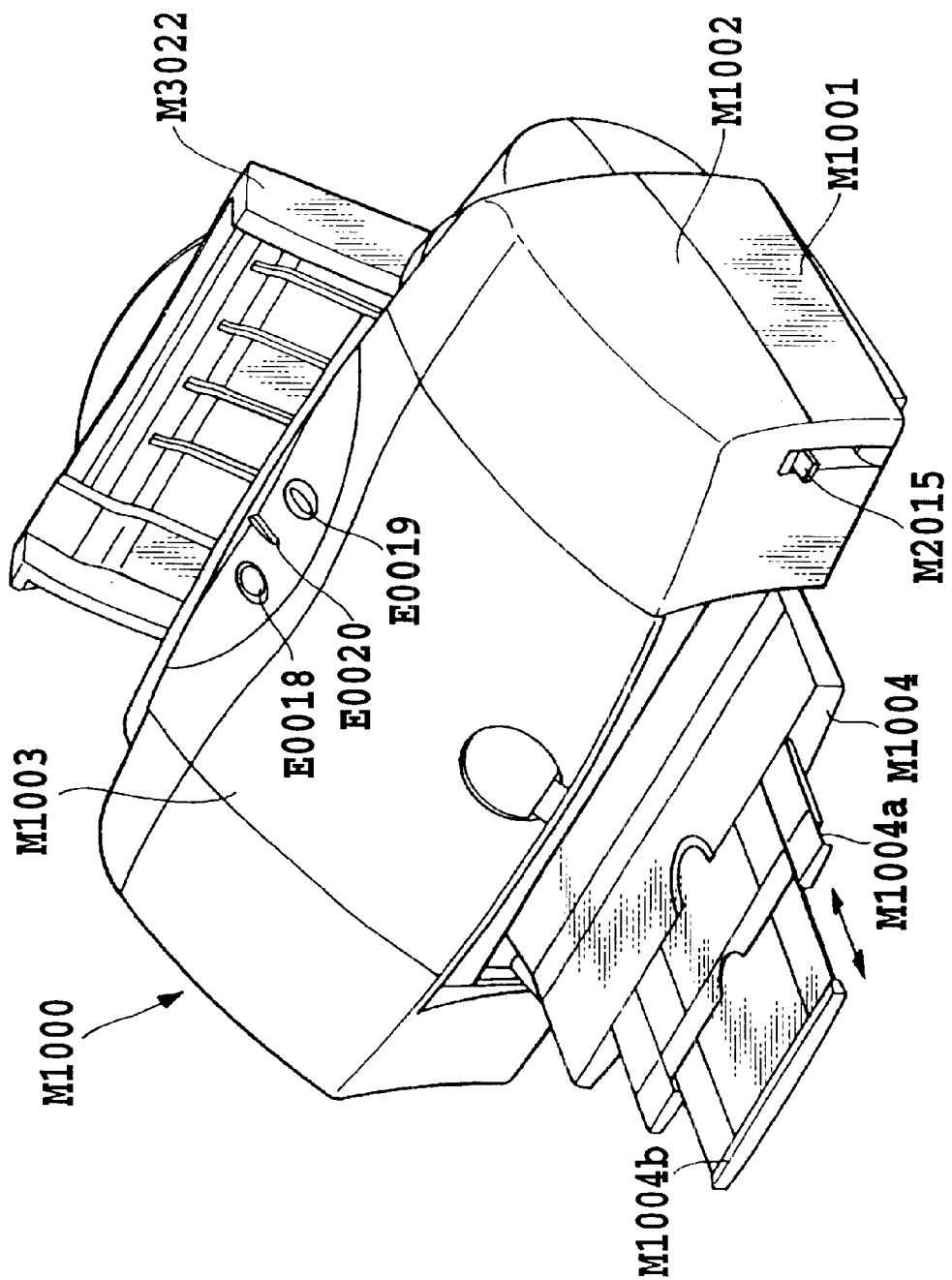
FIG. 1 is a perspective view showing an external construction of an ink jet printer as one embodiment of the present invention.
Figure 2:
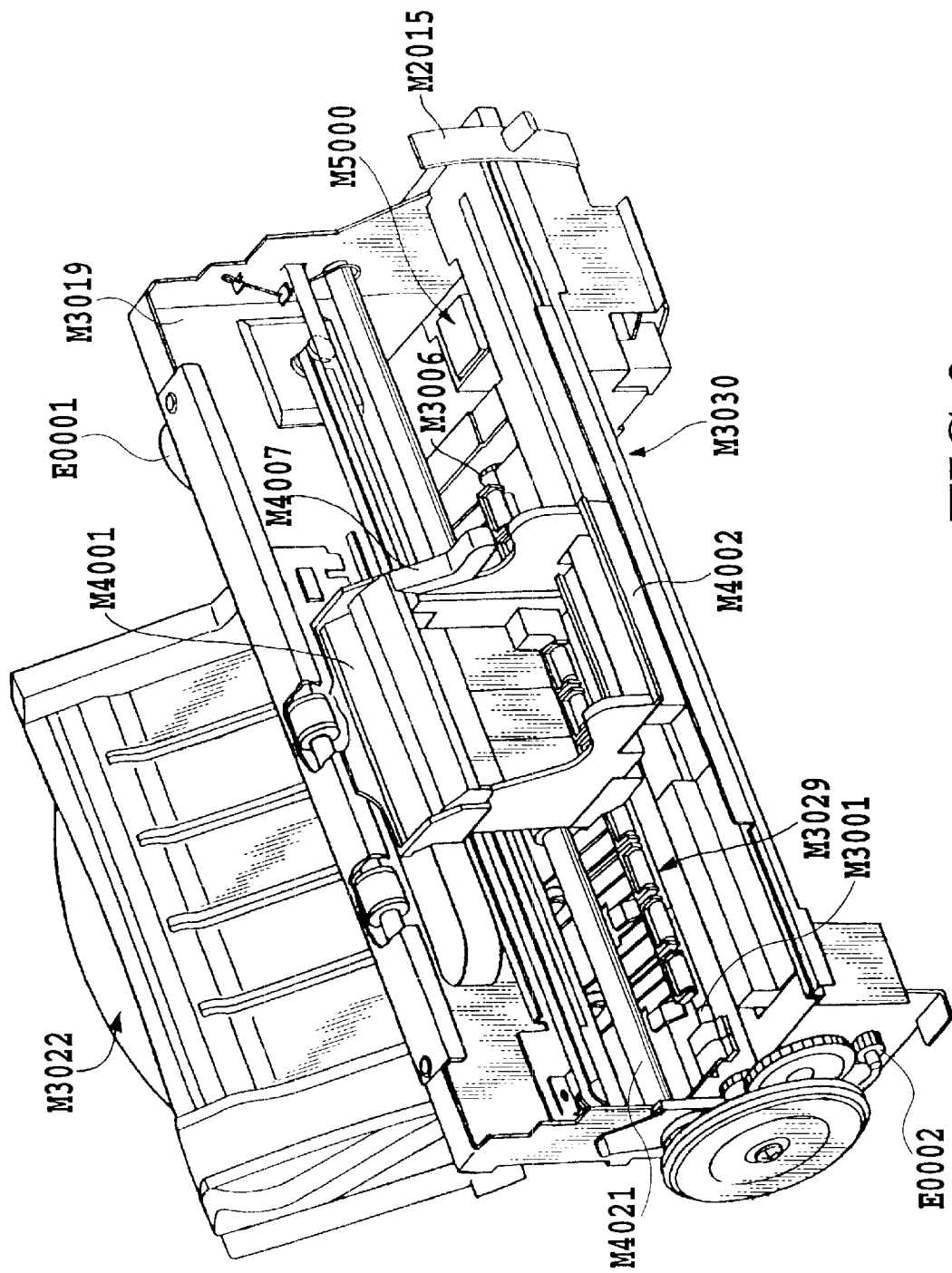
FIG. 2 is a perspective view showing the printer of FIG. 1 with an enclosure member removed.

FIGS. 1 and 2 show an outline construction of a printer using an ink jet printing system. In FIG. 1, a housing of a printer body M1000 of this embodiment has an enclosure member, including a lower case M1001, an upper case M1002, an access cover M1003 and a discharge tray M1004, and a chassis M3019 (see FIG. 2) accommodated in the enclosure member.

The chassis M3019 is made of a plurality of plate-like metal members with a predetermined rigidity to form a skeleton of the printing apparatus and holds various printing operation mechanisms described later.

The lower case M1001 forms roughly a lower half of the housing of the printer body M1000 and the upper case M1002 forms roughly an upper half of the printer body M1000.

These upper and lower cases, when combined, form a hollow structure having an accommodation space therein to accommodate various mechanisms described later. The printer body M1000 has an opening in its top portion and front portion.

The discharge tray M1004 has one end portion thereof rotatably supported on the lower case M1001. The discharge tray M1004, when rotated, opens or closes an opening formed in the front portion of the lower case M1001. When the print operation is to be performed, the discharge tray M1004 is rotated forwardly to open the opening so that printed sheets can be discharged and successively stacked. The discharge tray M1004 accommodates two auxiliary trays 1004a, M1004b. These auxiliary trays can be drawn out forwardly as required to expand or reduce the paper support area in three steps.

The access cover M1003 has one end portion thereof rotatably supported on the upper case M1002 and opens or closes an opening formed in the upper surface of the upper case M1002. By opening the access cover M1003, a print head cartridge H1000 or an ink tank H1900 installed in the body can be replaced. When the access cover M1003 is opened or closed, a projection formed at the back of the access cover, not shown here, pivots a cover open/close lever. Detecting the pivotal position of the lever as by a micro-switch and so on can determine whether the access cover is open or closed.

At the upper rear surface of the upper case M1002 a power key E0018, a resume key E0019 and an LED E0020 are provided. When the power key E0018 is pressed, the LED E0020 lights up indicating to an operator that the apparatus is ready to print. The LED E0020 has a variety of display functions, such as alerting the operator to printer troubles as by changing its blinking intervals and color. Further, a buzzer E0021 (FIG. 7) may be sounded. When the trouble is eliminated, the resume key E0019 is pressed to resume the printing.

2. Printing Operation Mechanism

Next, a printing operation mechanism installed and held in the printer body M1000 according to this embodiment will be explained.

The printing operation mechanism in this embodiment comprises: an automatic sheet feed unit M3022 to automatically feed a print sheet into the printer body; a sheet transport unit M3029 to guide the print sheets, fed one at a time from the automatic sheet feed unit, to a predetermined print position and to guide the print sheet from the print position to a discharge unit M3030; a print unit to perform a desired printing on the print sheet carried to the print position; and an ejection performance recovery unit M5000 to recover the ink ejection performance of the print unit.

Here, the print unit will be described. The print unit comprises a carriage M4001 movably supported on a carriage shaft M4021 and a print head cartridge H1000 removably mounted on the carriage M4001.

2.1 Print Head Cartridge

First, the print head cartridge used in the print unit will be described with reference to FIGS. 3 to 5.

Figure 3:
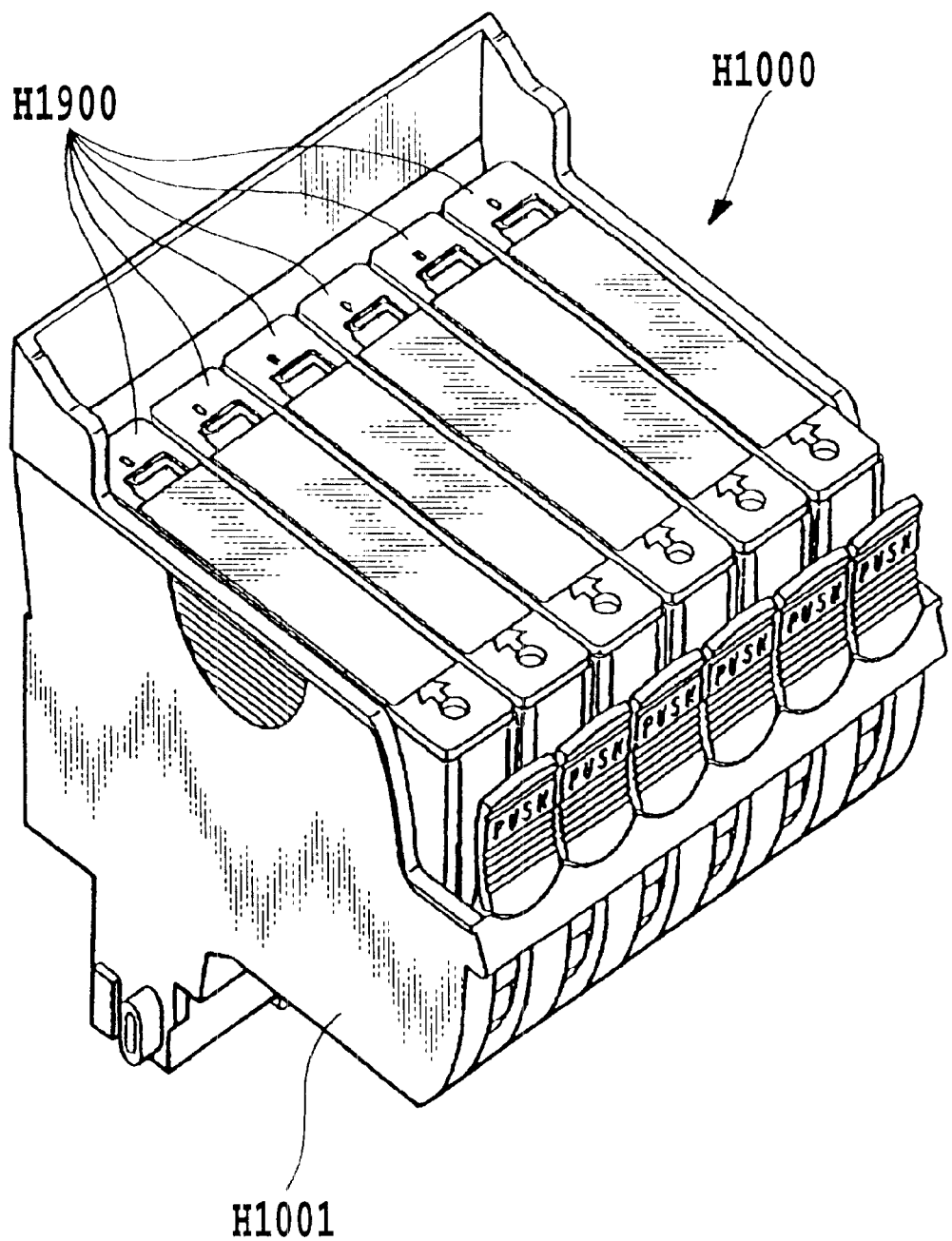
FIG. 3 is a perspective view showing an assembled print head cartridge used in the printer of one embodiment of the present invention.
Figure 4:
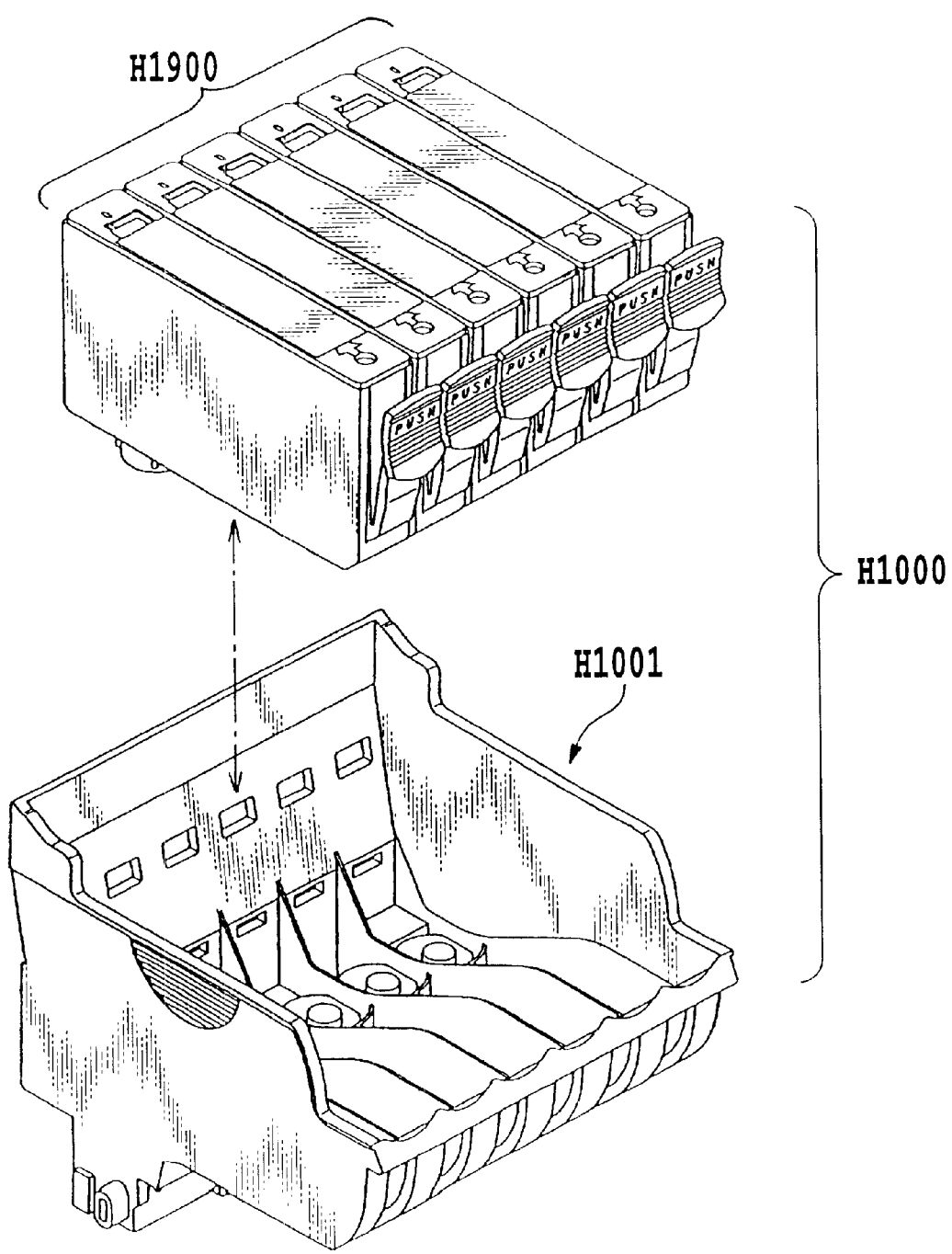
FIG. 4 is an exploded perspective view showing the print head cartridge of FIG. 3.

The print head cartridge H1000 in this embodiment, as shown in FIG. 3, has an ink tank H1900 containing inks and a print head H1001 for ejecting ink supplied from the ink tank H1900 out through nozzles according to print information. The print head H1001 is of a so-called cartridge type in which it is removably mounted to the carriage M4001 described later.

The ink tank for this print head cartridge H1000 consists of separate ink tanks H1900 of, for example, black, light cyan, light magenta, cyan, magenta and yellow to enable color printing with as high an image quality as photograph. As shown in FIG. 4, these individual ink tanks are removably mounted to the print head H1001.

Figure 5:
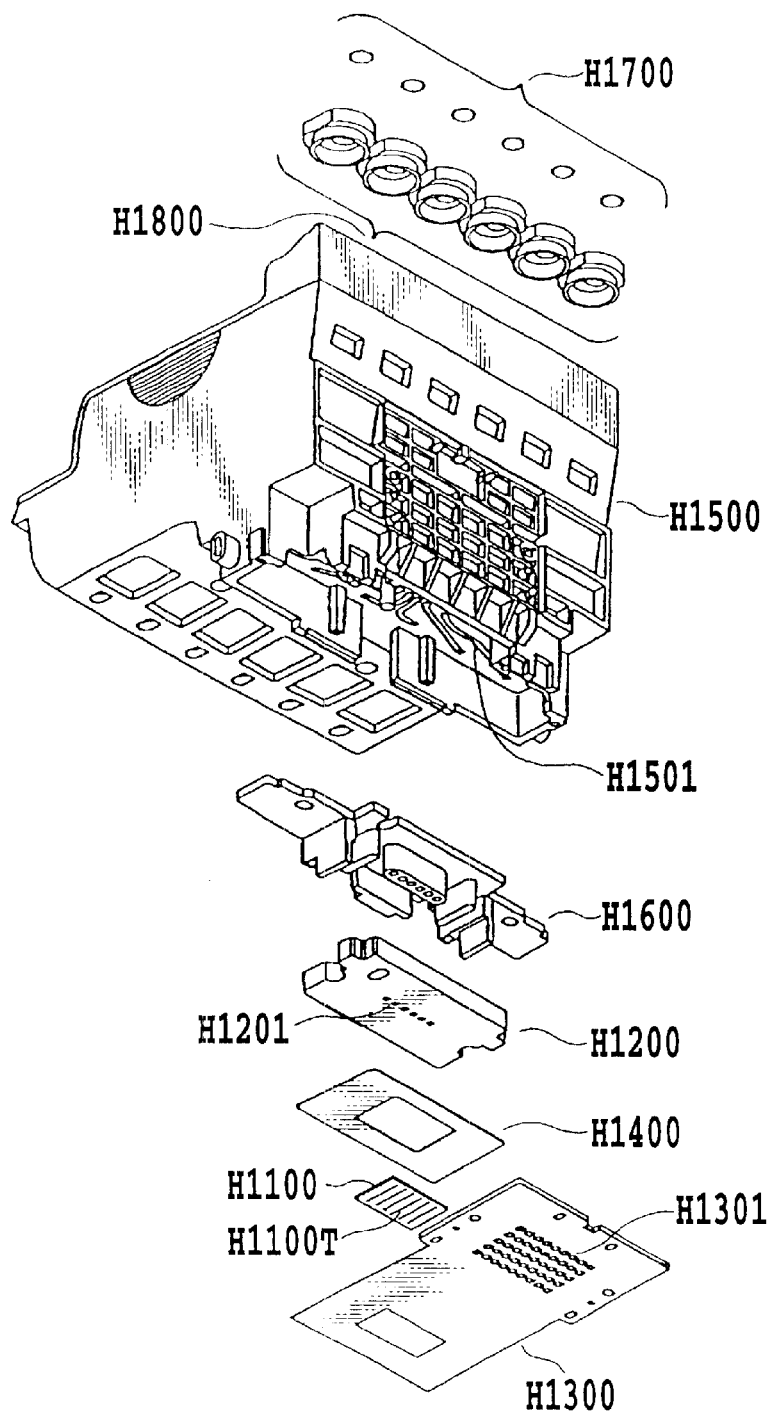
FIG. 5 is an exploded perspective view of the print head of FIG. 4 as seen diagonally below.

Then, the print head H1001, as shown in the perspective view of FIG. 5, comprises a print element substrate H1100, a first plate H1200, an electric wiring board H1300, a second plate H1400, a tank holder H1500, a flow passage forming member H1600, a filter H1700 and a seal rubber H1800.

The print element silicon substrate H1100 has formed in one of its surfaces, by the film deposition technology, a plurality of print elements to produce energy for ejecting ink and electric wires, such as aluminum, for supplying electricity to individual print elements. A plurality of ink passages and a plurality of nozzles H1100T, both corresponding to the print elements, are also formed by the photolithography technology. In the back of the print element substrate H1100, there are formed ink supply ports for supplying ink to the plurality of ink passages. The print element substrate H1100 is securely bonded to the first plate H1200 which is formed with ink supply ports H1201 for supplying ink to the print element substrate H1100. The first plate H1200 is securely bonded with the second plate H1400 having an opening. The second plate H1400 holds the electric wiring board H1300 to electrically connect the electric wiring board H1300 with the print element substrate H1100. The electric wiring board H1300 is to apply electric signals for ejecting ink to the print element substrate H1100, and has electric wires associated with the print element substrate H1100 and external signal input terminals H1301 situated at electric wires' ends for receiving electric signals from the printer body. The external signal input terminals H1301 are positioned and fixed at the back of a tank holder H1500 described later.

The tank holder H1500 that removably holds the ink tank H1900 is securely attached, as by ultrasonic fusing, with the flow passage forming member H1600 to form an ink passage H1501 from the ink tank H1900 to the first plate H1200. At the ink tank side end of the ink passage H1501 that engages with the ink tank H1900, a filter H1700 is provided to prevent external dust from entering. A seal rubber H1800 is provided at a portion where the filter H1700 engages the ink tank H1900, to prevent evaporation of the ink from the engagement portion.

As described above, the tank holder unit, which includes the tank holder H1500, the flow passage forming member H1600, the filter H1700 and the seal rubber H1800, and the print element unit, which includes the print element substrate H1100, the first plate H1200, the electric wiring board H1300 and the second plate H1400, are combined as by adhesives to form the print head H1001.

2.2 Carriage

Next, by referring to FIG. 2, the carriage M4001 carrying the print head cartridge H1000 will be explained.

As shown in FIG. 2, the carriage M4001 has a carriage cover M4002 for guiding the print head H1001 to a predetermined mounting position on the carriage M4001, and a head set lever M4007 that engages and presses against the tank holder H1500 of the print head H1001 to set the print head H1001 at a predetermined mounting position.

That is, the head set lever M4007 is provided at the upper part of the carriage M4001 so as to be pivotable about a head set lever shaft. There is a spring-loaded head set plate (not shown) at an engagement portion where the carriage M4001 engages the print head H1001. With the spring force, the head set lever M4007 presses against the print head H1001 to mount it on the carriage M4001.

At another engagement portion of the carriage M4001 with the print head H1001, there is provided a contact flexible printed cable (see FIG. 7: simply referred to as a contact FPC hereinafter) E0011 whose contact portion electrically contacts a contact portion (external signal input terminals) H1301 provided in the print head H1001 to transfer various information for printing and supply electricity to the print head H1001.

Between the contract portion of the contact FPC E0011 and the carriage M4001 there is an elastic member not shown, such as rubber. The elastic force of the elastic member and the pressing force of the head set lever spring combine to ensure a reliable contact between the contact portion of the contact FPC E0011 and the carriage M4001. Further, the contact FPC E0011 is connected to a carriage substrate E0013 mounted at the back of the carriage M4001 (see FIG. 7)

3. Scanner

The printer of this embodiment can mount a scanner in the carriage M4001 in place of the print head cartridge H1000 and be used as a reading device.

The scanner moves together with the carriage M4001 in the main scan direction, and reads an image on a document fed instead of the printing medium as the scanner moves in the main scan direction. Alternating the scanner reading operation in the main scan direction and the document feed in the sub-scan direction enables one page of document image information to be read.

Figure 6:
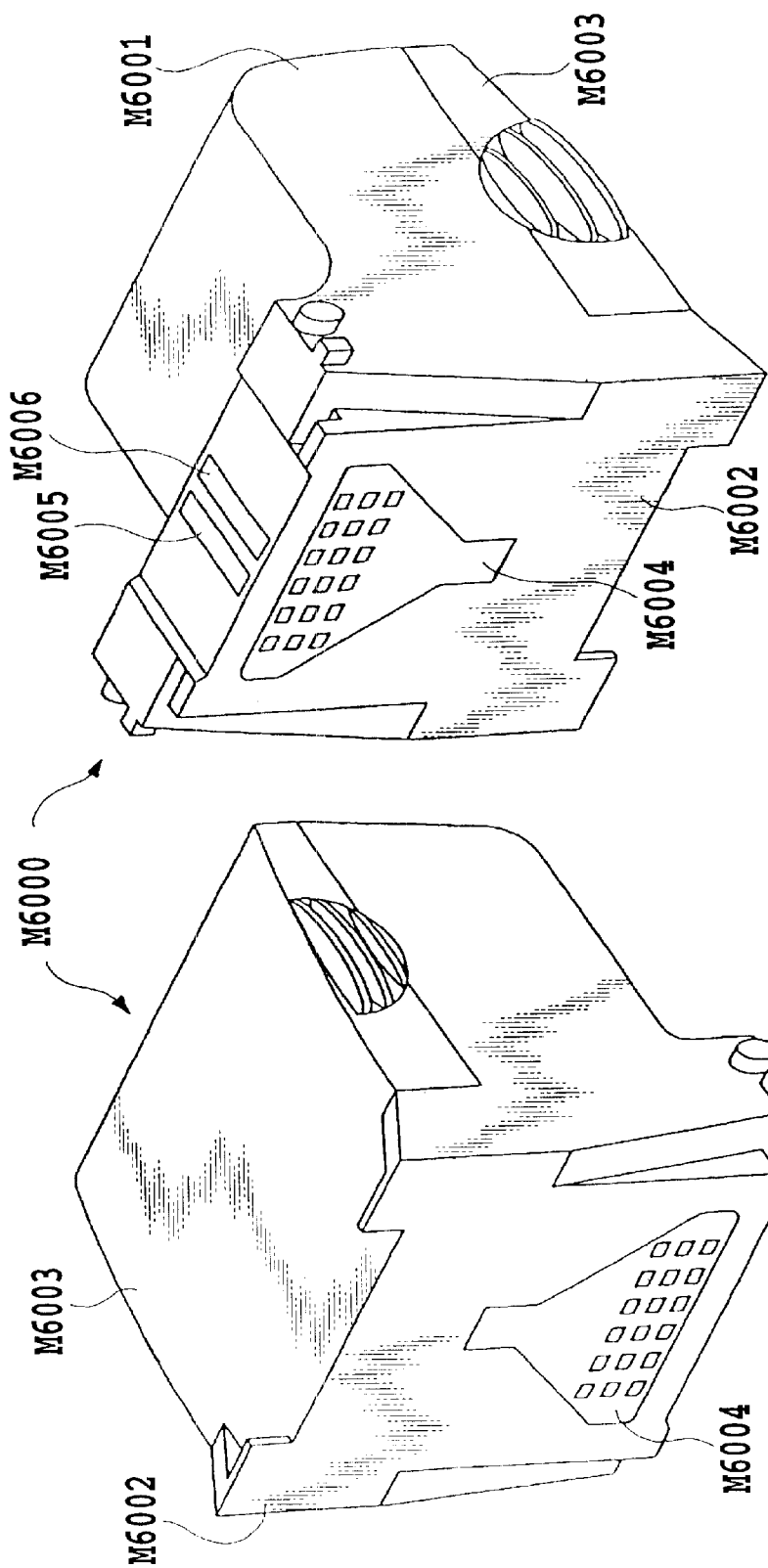
FIGS. 6A and 6B are perspective views showing a construction of a scanner cartridge upside down which can be mounted in the printer of one embodiment of the present invention instead of the print head cartridge of FIG. 3.

FIGS. 6A and 6B show the scanner M6000 upside down to explain about its outline construction.

As shown in the figure, a scanner holder M6001 is shaped like a box and contains an optical system and a processing circuit necessary for reading. A reading lens H6006 is provided at a portion that faces the surface of a document when the scanner M6000 is mounted on the carriage M4001. The lens M6006 focuses light reflected from the document surface onto a reading unit inside the scanner to read the document image. An illumination lens M6005 has a light source not shown inside the scanner. The light emitted from the light source is radiated onto the document through the lens M6005.

The scanner cover M6003 secured to the bottom of the scanner holder M6001 shields the interior of the scanner holder M6001 from light. Louver-like grip portions are provided at the sides to improve the ease with which the scanner can be mounted to and dismounted from the carriage M4001. The external shape of the scanner holder M6001 is almost similar to that of the print head H1001, and the scanner can be mounted to or dismounted from the carriage M4001 in a manner similar to that of the print head H1001.

The scanner holder M6001 accommodates a substrate having a reading circuit, and a scanner contact PCB M6004 connected to this substrate is exposed outside. When the scanner M6000 is mounted on the carriage M4001, the scanner contact PCB M6004 contacts the contact FPC E0011 of the carriage M4001 to electrically connect the substrate to a control system on the printer body side through the carriage M4001.

4. Example Configuration of Printer Electric Circuit

Next, an electric circuit configuration in this embodiment of the invention will be explained.

Figure 7:
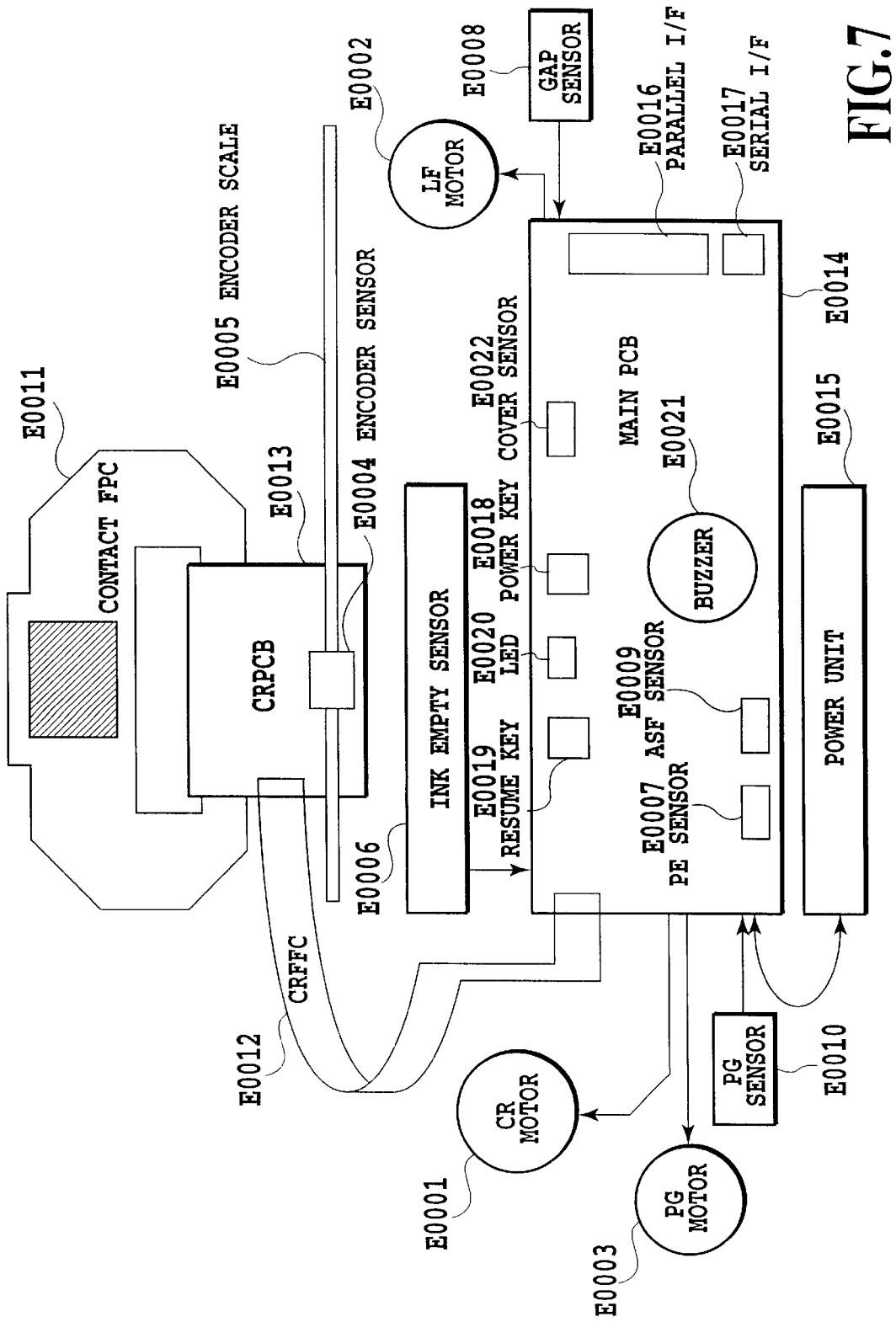
FIG. 7 is a block diagram schematically showing the overall configuration of an electric circuitry of the printer according to one embodiment of the present invention.

FIG. 7 schematically shows the overall configuration of the electric circuit in this embodiment.

The electric circuit in this embodiment comprises mainly a carriage substrate (CRPCB) E0013, a main PCB (printed circuit board) E0014 and a power supply unit E0015.

The power supply unit E0015 is connected to the main PCB E0014 to supply a variety of drive power.

The carriage substrate E0013 is a printed circuit board unit mounted on the carriage M4001 (FIG. 2) and functions as an interface for transferring signals to and from the print head through the contact FPC E0011. In addition, based on a pulse signal output from an encoder sensor E0004 as the carriage M4001 moves, the carriage substrate E0013 detects a change in the positional relation between an encoder scale E0005 and the encoder sensor E0004 and sends its output signal to the main PCB E0014 through a flexible flat cable (CRFFC) E0012.

Further, the main PCB E0014 is a printed circuit board unit that controls the operation of various parts of the ink jet printing apparatus in this embodiment, and has I/O ports for a paper end sensor (PE sensor) E0007, an automatic sheet feeder (ASF) sensor E0009, a cover sensor E0022, a parallel interface (parallel I/F) E0016, a serial interface (Serial I/F) E0017, a resume key E0019, an LED E0020, a power key E0018 and a buzzer E0021. The main PCB E0014 is connected to and controls a motor (CR motor) E0001 that constitutes a drive source for moving the carriage M4001 in the main scan direction; a motor (LF motor) E0002 that constitutes a drive source for transporting the printing medium; and a motor (PG motor) E0003 that performs the functions of recovering the ejection performance of the print head and feeding the printing medium. The main PCB E0014 also has connection interfaces with an ink empty sensor E0006, a gap sensor E0008, a PG sensor E0010, the CRFFC E0012 and the power supply unit E0015.

Figures 8, 8A:
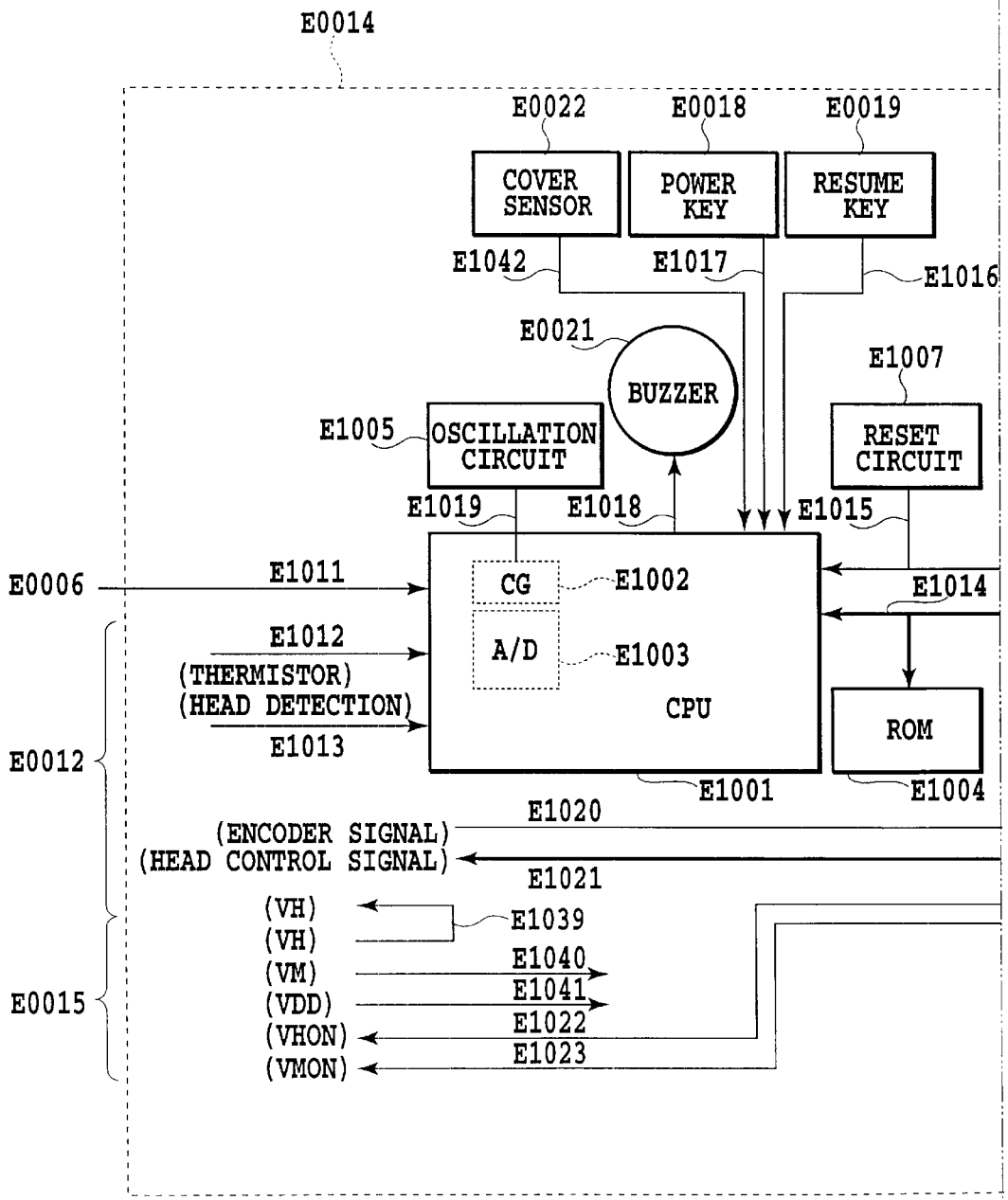
FIG. 8 is a diagram showing the relation between FIGS. 8A and 8B, FIGS. 8A and 8B being block diagrams representing an example inner configuration of a main printed circuit board (PCB) in the electric circuitry of FIG. 7.
Figure 8B:
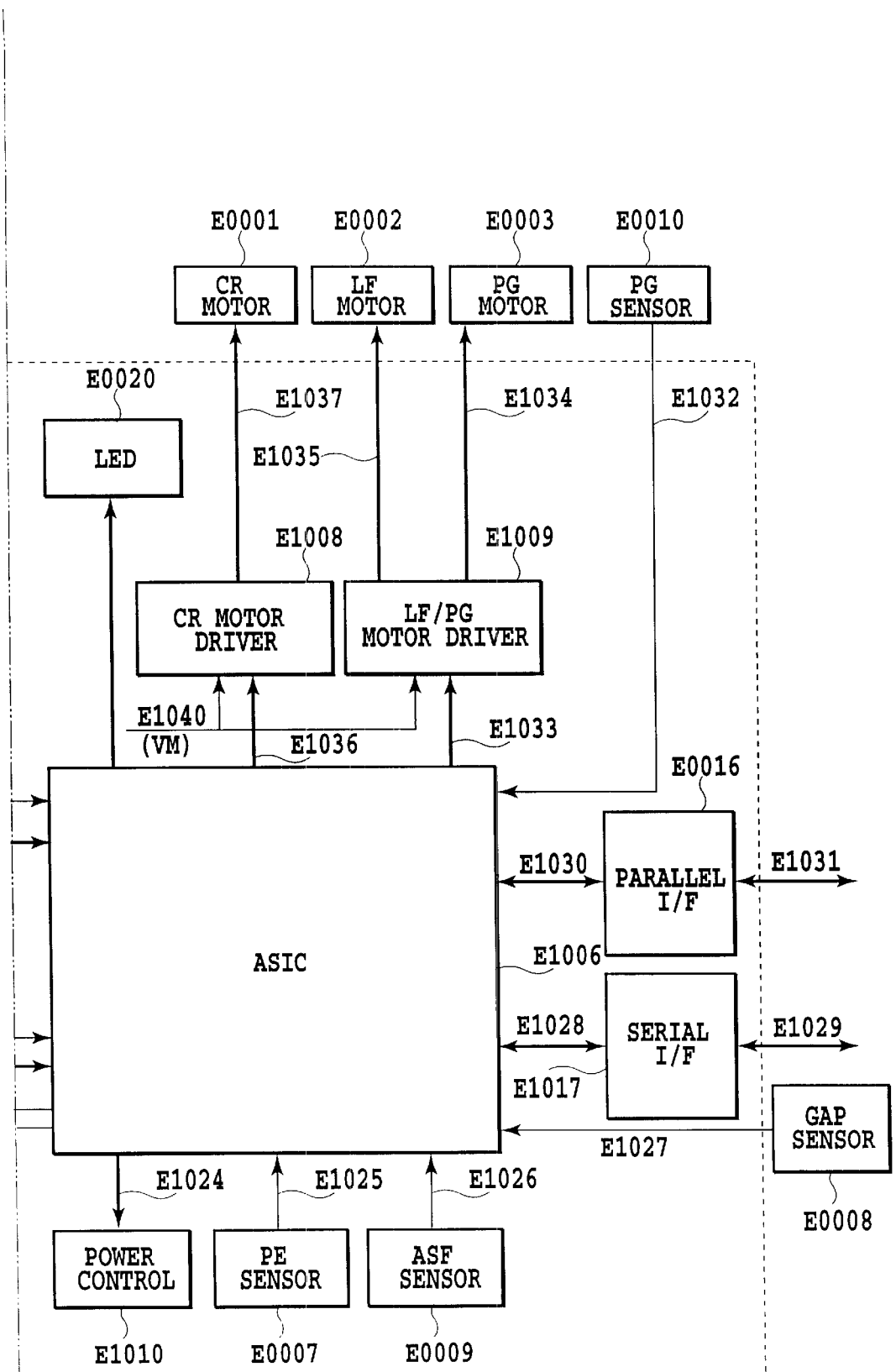

FIG. 8 is a diagram showing the relation between FIGS. 8A and 8B, and FIGS. 8A and 8B are block diagrams showing an inner configuration of the main PCB E0014.

Reference number E1001 represents a CPU, which has a clock generator (CG) E1002 connected to an oscillation circuit E1005 to generate a system clock based on an output signal E1019 of the oscillation circuit E1005. The CPU E1001 is connected to an ASIC (application specific integrated circuit) and a ROM E1004 through a control bus 1014. According to a program stored in the ROM E1004, the CPU E1001 controls the ASIC E1006, checks the status of an input signal E1017 from the power key, an input signal 1016 from the resume key, a cover detection signal E1042 and a head detection signal (HSENS) E1013, drives the buzzer E0021 according to a buzzer signal (BUZ) E1018, and checks the status of an ink empty detection signal (INKS) E1011 connected to a built-in A/D converter E1003 and of a temperature detection signal (TH) E1012 from a thermistor. The CPU E1001 also performs various other logic operations and makes conditional decisions to control the operation of the ink jet printing apparatus.

The head detection signal E1013 is a head mount detection signal entered from the print head cartridge H1000 through the flexible flat cable E0012, the carriage substrate E0013 and the contact FPC E0011. The ink empty detection signal E1011 is an analog signal output from the ink empty sensor E0006. The temperature detection signal E1012 is an analog signal from the thermistor (not shown) provided on the carriage substrate E0013.

Designated E1008 is a CR motor driver that uses a motor power supply (VM) E1040 to generate a CR motor drive signal E1037 according to a CR motor control signal E1036 from the ASIC E1006 to drive the CR motor E0001. E1009 designates an LF/PG motor driver which uses the motor power supply E1040 to generate an LF motor drive signal E1035 according to a pulse motor control signal (PM control signal) E1033 from the ASIC E1006 to drive the LF motor. The LF/PG motor driver E1009 also generates a PG motor drive signal E1034 to drive the PG motor.

Designated E1010 is a power supply control circuit which controls the supply of electricity to respective sensors with light emitting elements according to a power supply control signal E1024 from the ASIC E1006. The parallel I/F E0016 transfers a parallel I/F signal E1030 from the ASIC E1006 to a parallel I/F cable E1031 connected to external circuits and also transfers a signal of the parallel I/F cable E1031 to the ASIC E1006. The serial I/F E0017 transfers a serial I/F signal E1028 from the ASIC E1006 to a serial I/F cable E1029 connected to external circuits, and also transfers a signal from the serial I/F cable E1029 to the ASIC E1006.

The power supply unit E0015 provides a head power signal (VH) E1039, a motor power signal (VM) E1040 and a logic power signal (VDD) E1041. A head power ON signal (VHON) E1022 and a motor power ON signal (VMON) E1023 are sent from the ASIC E1006 to the power supply unit E0015 to perform the ON/OFF control of the head power signal E1039 and the motor power signal E1040. The logic power signal (VDD) E1041 supplied from the power supply unit E0015 is voltage-converted as required and given to various parts inside or outside the main PCB E0014.

The head power signal E1039 is smoothed by a circuit of the main PCB E0014 and then sent out to the flexible flat cable E0011 to be used for driving the print head cartridge H1000. E1007 denotes a reset circuit which detects a reduction in the logic power signal E1041 and sends a reset signal (RESET) to the CPU E1001 and the ASIC E1006 to initialize them.

The ASIC E1006 is a single-chip semiconductor integrated circuit and is controlled by the CPU E1001 through the control bus E1014 to output the CR motor control signal E1036, the PM control signal E1033, the power supply control signal E1024, the head power ON signal E1022 and the motor power ON signal E1023. It also transfers signals to and from the parallel interface E0016 and the serial interface E0017. In addition, the ASIC E1006 detects the status of a PE detection signal (PES) E1025 from the PE sensor E0007, an ASF detection signal (ASFS) E1026 from the ASF sensor E0009, a gap detection signal (GAPS) E1027 from the GAP sensor E0008 for detecting a gap between the print head and the printing medium, and a PG detection signal (PGS) E1032 from the PG sensor E0010, and sends data representing the statuses of these signals to the CPU E1001 through the control bus E1014. Based on the data received, the CPU E1001 controls the operation of an LED drive signal E1038 to turn on or off the LED E0020.

Further, the ASIC E1006 checks the status of an encoder signal (ENC) E1020, generates a timing signal, interfaces with the print head cartridge H1000 and controls the print operation by a head control signal E1021. The encoder signal (ENC) E1020 is an output signal of the CR encoder sensor E0004 received through the flexible flat cable E0012. The head control signal E1021 is sent to the print head H1001 through the flexible flat cable E0012, carriage substrate E0013 and contact FPC E0011.

Figure 9A:
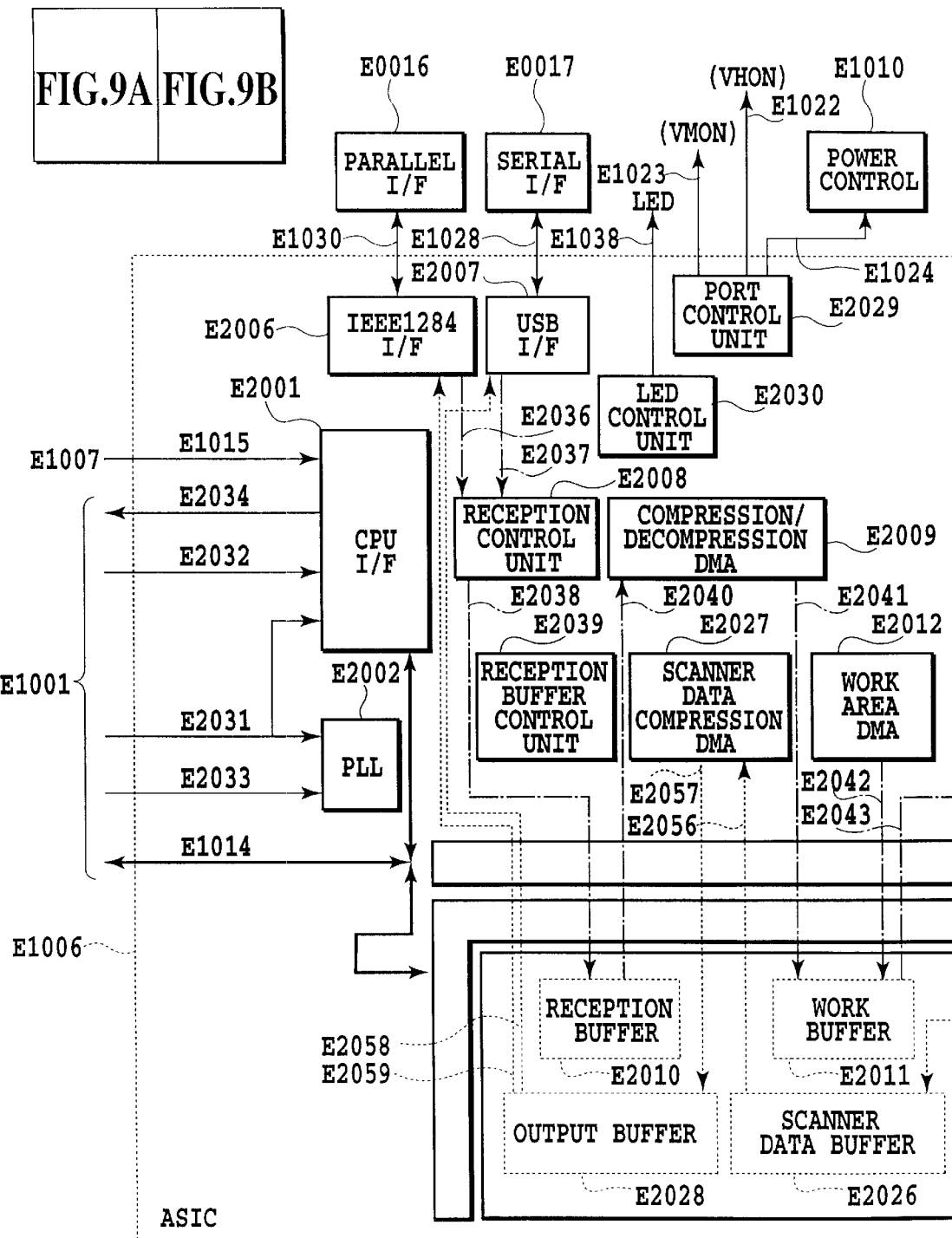
FIG. 9 is a diagram showing the relation between FIGS. 9A and 9B, FIGS. 9A and 9B being block diagrams representing an example inner configuration of an application specific integrated circuit (ASIC) in the main PCB of FIGS. 8A and 8B.
Figure 9B:
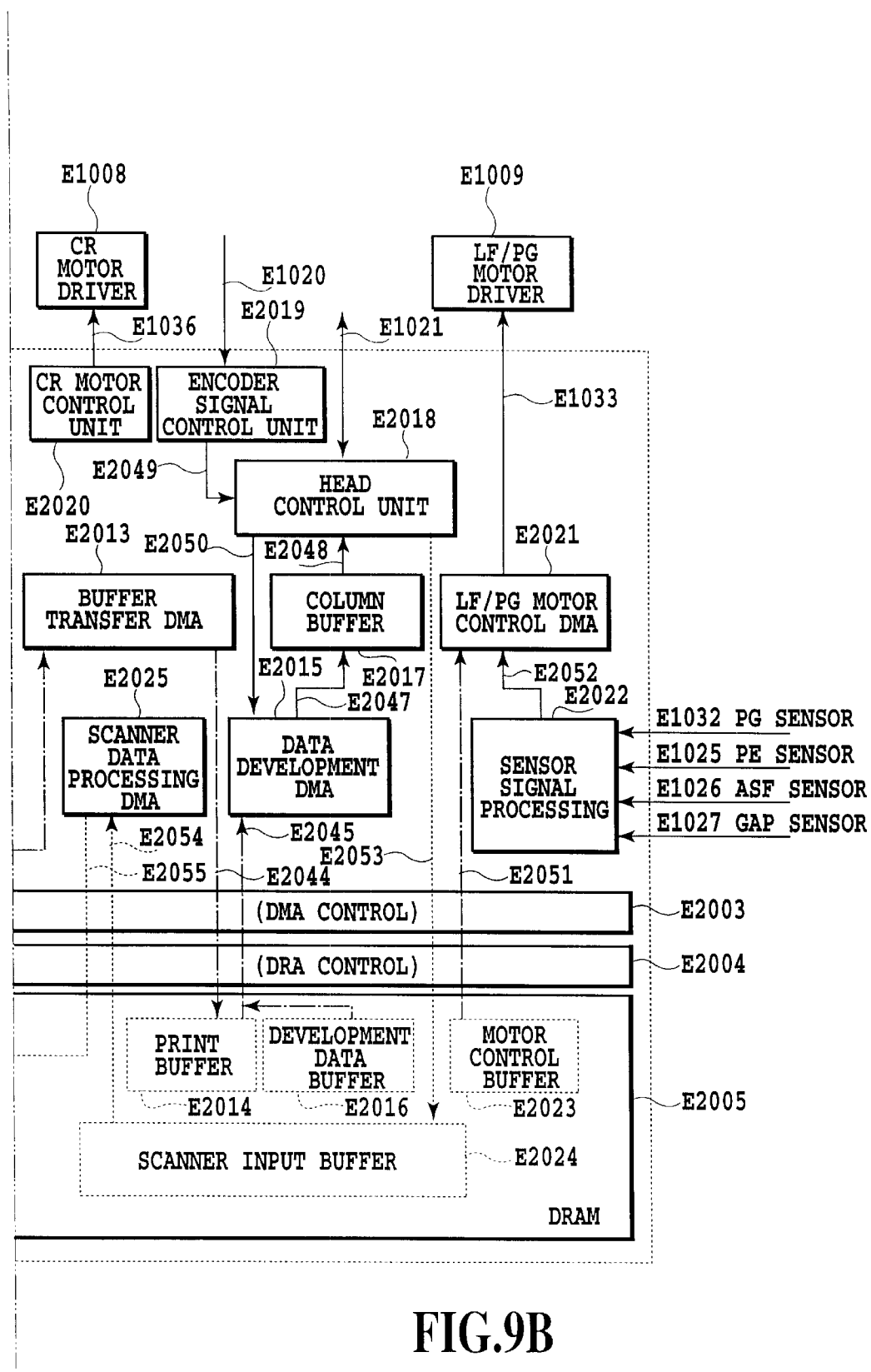

FIG. 9 is a diagram showing the relation between FIGS. 9A and 9B, and FIGS. 9A and 9B are block diagrams showing an example internal configuration of the ASIC E1006.

In these figures, only the flow of data, such as print data and motor control data, associated with the control of the head and various mechanical components is shown between each block, and control signals and clock associated with the read/write operation of the registers incorporated in each block and control signals associated with the DMA control are omitted to simplify the drawing.

In the figures, reference number E2002 represents a PLL controller which, based on a clock signal (CLK) E2031 and a PLL control signal (PLLON) E2033 output from the CPU E1001, generates a clock (not shown) to be supplied to the most part of the ASIC E1006.

Denoted E2001 is a CPU interface (CPU I/F) E2001, which controls the read/write operation of register in each block, supplies a clock to some blocks and accepts an interrupt signal (none of these operations are shown) according to a reset signal E1015, a software reset signal (PDWN) E2032 and a clock signal (CLK) E2031 output from the CPU E1001, and control signals from the control bus E1014. The CPU I/F E2001 then outputs an interrupt signal (INT) E2034 to the CPU E1001 to inform it of the occurrence of an interrupt within the ASIC E1006.

E2005 denotes a DRAM which has various areas for storing print data, such as a reception buffer E2010, a work buffer E2011, a print buffer E2014 and a development data buffer E2016. The DRAM E2005 also has a motor control buffer E2023 for motor control and, as buffers used instead of the above print data buffers during the scanner operation mode, a scanner input buffer E2024, a scanner data buffer E2026 and an output buffer E2028.

The DRAM E2005 is also used as a work area by the CPU E1001 for its own operation. Designated E2004 is a DRAM control unit E2004 which performs read/write operations on the DRAM E2005 by switching between the DRAM access from the CPU E1001 through the control bus and the DRAM access from a DMA control unit E2003 described later.

The DMA control unit E2003 accepts request signals (not shown) from various blocks and outputs address signals and control signals (not shown) and, in the case of write operation, write data E2038, E2041, E2044, E2053, E2055, E2057 etc. to the DRAM control unit to make DRAM accesses. In the case of read operation, the DMA control unit:E2003 transfers the read data E2040, E2043, E2045, E2051, E2054, E2056, E2058, E2059 from the DRAM control unit E2004 to the requesting blocks.

Denoted E2006 is an IEEE 1284 I/F which functions as a bi-directional communication interface with external host devices, not shown, through the parallel I/F E0016 and is controlled by the CPU E1001 via CPU I/F E2001. During the printing operation, the IEEE 1284 I/F E2006 transfers the receive data (PIF receive data E2036) from the parallel I/F E0016 to a reception control unit E2008 by the DMA processing. During the scanner reading operation, the 1284 I/F E2006 sends the data (1284 transmit data (RDPIF) E2059) stored in the output buffer E2028 in the DRAM E2005 to the parallel I/F E0016 by the DMA processing.

Designated E2007 is a universal serial bus (USB) I/F which offers a bi-directional communication interface with external host devices, not shown, through the serial I/F E0017 and is controlled by the CPU E1001 through the CPU I/F E2001. During the printing operation, the universal serial bus (USB) I/F E2007 transfers received data (USB receive data E2037) from the serial I/F E0017 to the reception control unit E2008 by the DMA processing. During the scanner reading, the universal serial bus (USB) I/F E2007 sends data (USB transmit data (RDUSB) E2058) stored in the output buffer E2028 in the DRAM E2005 to the serial I/F E0017 by the DMA processing. The reception control unit E2008 writes data (WDIF E2038) received from the 1284 I/F E2006 or universal serial bus (USB) I/F E2007, whichever is selected, into a reception buffer write address managed by a reception buffer control unit E2039.

Designated E2009 is a compression/decompression DMA controller which is controlled by the CPU E1001 through the CPU I/F E2001 to read received data (raster data) stored in a reception buffer E2010 from a reception buffer read address managed by the reception buffer control unit E2039, compress or decompress the data (RDWK) E2040 according to a specified mode, and write the data as a print code string (WDWK) E2041 into the work buffer area.

Designated E2013 is a print buffer transfer DMA controller which is controlled by the CPU E1001 through the CPU I/F E2001 to read print codes (RDWP) E2043 on the work buffer E2011 and rearrange the print codes onto addresses on the print buffer E2014 that match the sequence of data transfer to the print head cartridge H1000 before transferring the codes (WDWP E2044). Reference number E2012 denotes a work area DMA controller which is controlled by the CPU E1001 through the CPU I/F E2001 to repetitively write specified work fill data (WDWF) E2042 into the area of the work buffer whose data transfer by the print buffer transfer DMA controller E2013 has been completed.

Designated E2015 is a print data development DMA controller E2015, which is controlled by the CPU E1001 through the CPU I/F E2001. Triggered by a data development timing signal E2050 from a head control unit E2018, the print data development DMA controller E2015 reads the print code that was rearranged and written into the print buffer and the development data written into the development data buffer E2016 and writes developed print data (RDHDG) E2045 into the column buffer E2017 as column buffer write data (WDHDG) E2047. The column buffer E2017 is an SRAM that temporarily stores the transfer data (developed print data) to be sent to the print head cartridge H1000, and is shared and managed by both the print data development DMA CONTROLLER and the head control unit through a handshake signal (not shown).

Designated E2018 is a head control unit E2018 which is controlled by the CPU E1001 through the CPU I/F E2001 to interface with the print head cartridge H1000 or the scanner through the head control signal. It also outputs a data development timing signal E2050 to the print data development DMA controller according to a head drive timing signal E2049 from the encoder signal processing unit E2019.

During the printing operation, the head control unit E2018, when it receives the head drive timing signal E2049, reads developed print data (RDHD) E2048 from the column buffer and outputs the data to the print head cartridge H1000 as the head control signal E1021.

In the scanner reading mode, the head control unit E2018 DMA-transfers the input data (WDHD) E2053 received as the head control signal E1021 to the scanner input buffer E2024 on the DRAM E2005. Designated E2025 is a scanner data processing DMA controller E2025 which is controlled by the CPU E1001 through the CPU I/F E2001 to read input buffer read data (RDAV) E2054 stored in the scanner input buffer E2024 and writes the averaged data (WDAV) E2055 into the scanner data buffer E2026 on the DRAM E2005.

Designated E2027 is a scanner data compression DMA controller which is controlled by the CPU E1001 through the CPU I/F E2001 to read processed data (RDYC) E2056 on the scanner data buffer E2026, perform data compression, and write the compressed data (WDYC) E2057 into the output buffer E2028 for transfer.

Designated E2019 is an encoder signal processing unit which, when it receives an encoder signal (ENC), outputs the head drive timing signal E2049 according to a mode determined by the CPU E1001. The encoder signal processing unit E2019 also stores in a register information on the position and speed of the carriage M4001 obtained from the encoder signal E1020 and presents it to the CPU E1001. Based on this information, the CPU E1001 determines various parameters for the CR motor E0001. Designated E2020 is a CR motor control unit which is controlled by the CPU E1001 through the CPU I/F E2001 to output the CR motor control signal E1036.

Denoted E2022 is a sensor signal processing unit which receives detection signals E1032, E1025, E1026 and E1027 output from the PG sensor E0010, the PE sensor E0007, the ASF sensor E0009 and the gap sensor E0008, respectively, and transfers these sensor information to the CPU E1001 according to the mode determined by the CPU E1001. The sensor signal processing unit E2022 also outputs a sensor detection signal E2052 to a DMA controller E2021 for controlling LF/PG motor.

The DMA controller E2021 for controlling LF/PG motor is controlled by the CPU E1001 through the CPU I/F E2001 to read a pulse motor drive table (RDPM) E2051 from the motor control buffer E2023 on the DRAM E2005 and output a pulse motor control signal E1033. Depending on the operation mode, the controller outputs the pulse motor control signal E1033 upon reception of the sensor detection signal as a control trigger.

Designated E2030 is an LED control unit which is controlled by the CPU E1001 through the CPU I/F E2001 to output an LED drive signal E1038. Further, designated E2029 is a port control unit which is controlled by the CPU E1001 through the CPU I/F E2001 to output the head power ON signal E1022, the motor power ON signal E1023 and the power supply control signal E1024.

5. Operation of Printer

Figure 10:
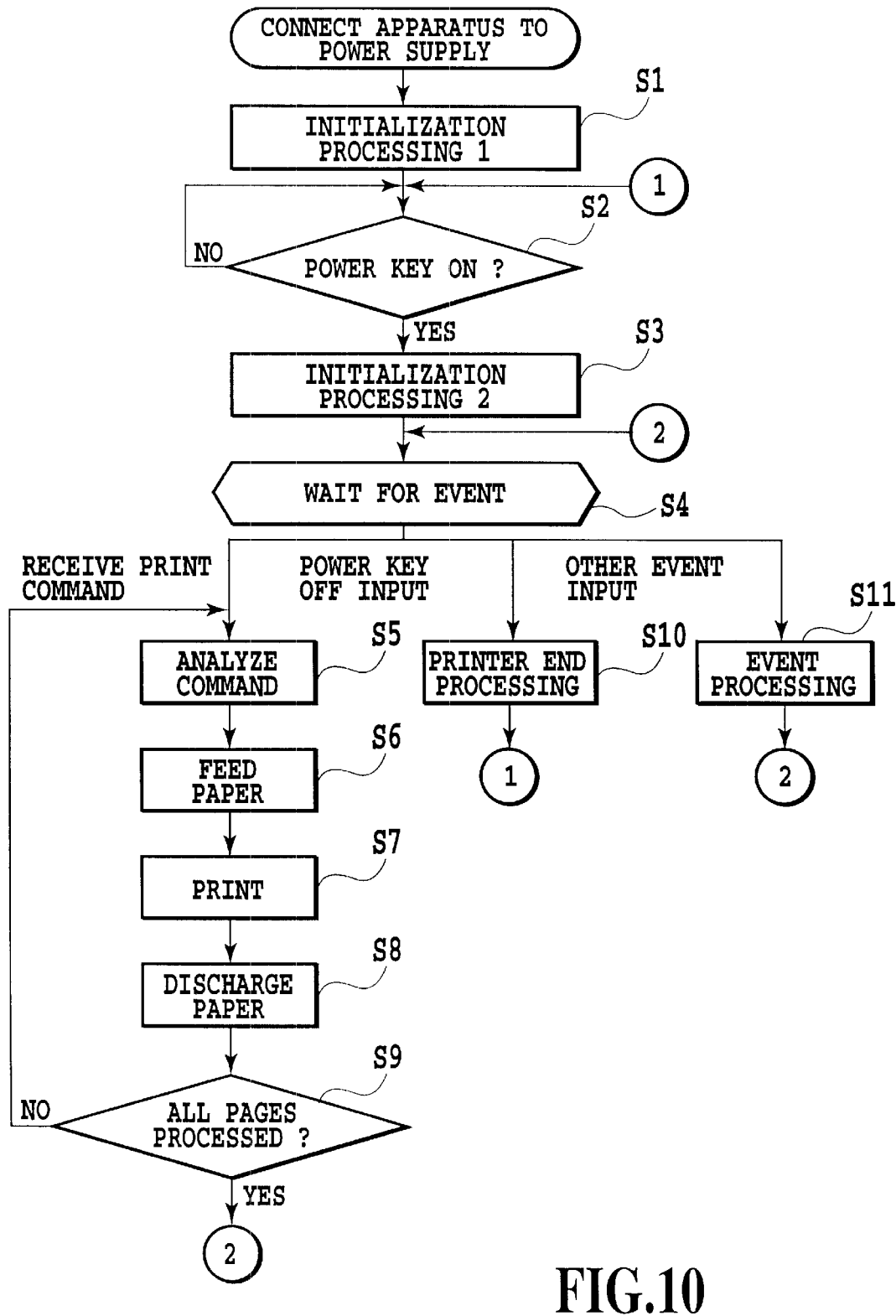
FIG. 10 is a flow chart showing an example of operation of the printer as one embodiment of the present invention.

Next, the operation of the ink jet printing apparatus in this embodiment of the invention with the above configuration will be explained by referring to the flow chart of FIG. 10.

When the printer body M1000 is connected to an AC power supply, a first initialization is performed at step S1. In this initialization process, the electric circuit system including the ROM and RAM in the apparatus is checked to confirm that the apparatus is electrically operable.

Next, step S2 checks if the power key E0018 on the upper case M1002 of the printer body M1000 is turned on. When it is decided that the power key E0018 is pressed, the processing moves to the next step S3 where a second initialization is performed.

In this second initialization, a check is made of various drive mechanisms and the print head of this apparatus. That is, when various motors are initialized and head information is read, it is checked whether the apparatus is normally operable.

Next, steps S4 waits for an event. That is, this step monitors a demand event from the external I/F, a panel key event from the user operation and an internal control event and, when any of these events occurs, executes the corresponding processing.

When, for example, step S4 receives a print command event from the external I/F, the processing moves to step S5. When a power key event from the user operation occurs at step S4, the processing moves to step S10. If another event occurs, the processing moves to step S11.

Step S5 analyzes the print command from the external I/F, checks a specified paper kind, paper size, print quality, paper feeding method and others, and stores data representing the check result into the DRAM E2005 of the apparatus before proceeding to step S6.

Next, step S6 starts feeding the paper according to the paper feeding method specified by the step S5 until the paper is situated at the print start position. The processing moves to step S7.

At step S7 the printing operation is performed. In this printing operation, the print data sent from the external I/F is stored temporarily in the print buffer. Then, the CR motor E0001 is started to move the carriage M4001 in the main-scanning direction. At the same time, the print data stored in the print buffer E2014 is transferred to the print head H1001 to print one line. When one line of the print data has been printed, the LF motor E0002 is driven to rotate the LF roller M3001 to transport the paper in the sub-scanning direction. After this, the above operation is executed repetitively until one page of the print data from the external I/F is completely printed, at which time the processing moves to step S8.

At step S8, the LF motor E0002 is driven to rotate the paper discharge roller M2003 to feed the paper until it is decided that the paper is completely fed out of the apparatus, at which time the paper is completely discharged onto the paper discharge tray M1004.

Next at step S9, it is checked whether all the pages that need to be printed have been printed and if there are pages that remain to be printed, the processing returns to step S5 and the steps S5 to S9 are repeated. When all the pages that need to be printed have been printed, the print operation is ended and the processing moves to step S4 waiting for the next event.

Step S10 performs the printing termination processing to stop the operation of the apparatus. That is, to turn of f various motors and print head, this step renders the apparatus ready to be cut off from power supply and then turns off power, before moving to step S4 waiting for the next event.

Step S11 performs other event processing. For example, this step performs processing corresponding to the ejection performance recovery command from various panel keys or external I/F and the ejection performance recovery event that occurs internally. After the recovery processing is finished, the printer operation moves to step S4 waiting for the next event.

6. Head Configuration

The construction and arrangement of nozzles in the print head H1001 used in this embodiment will be described.

Figure 11:
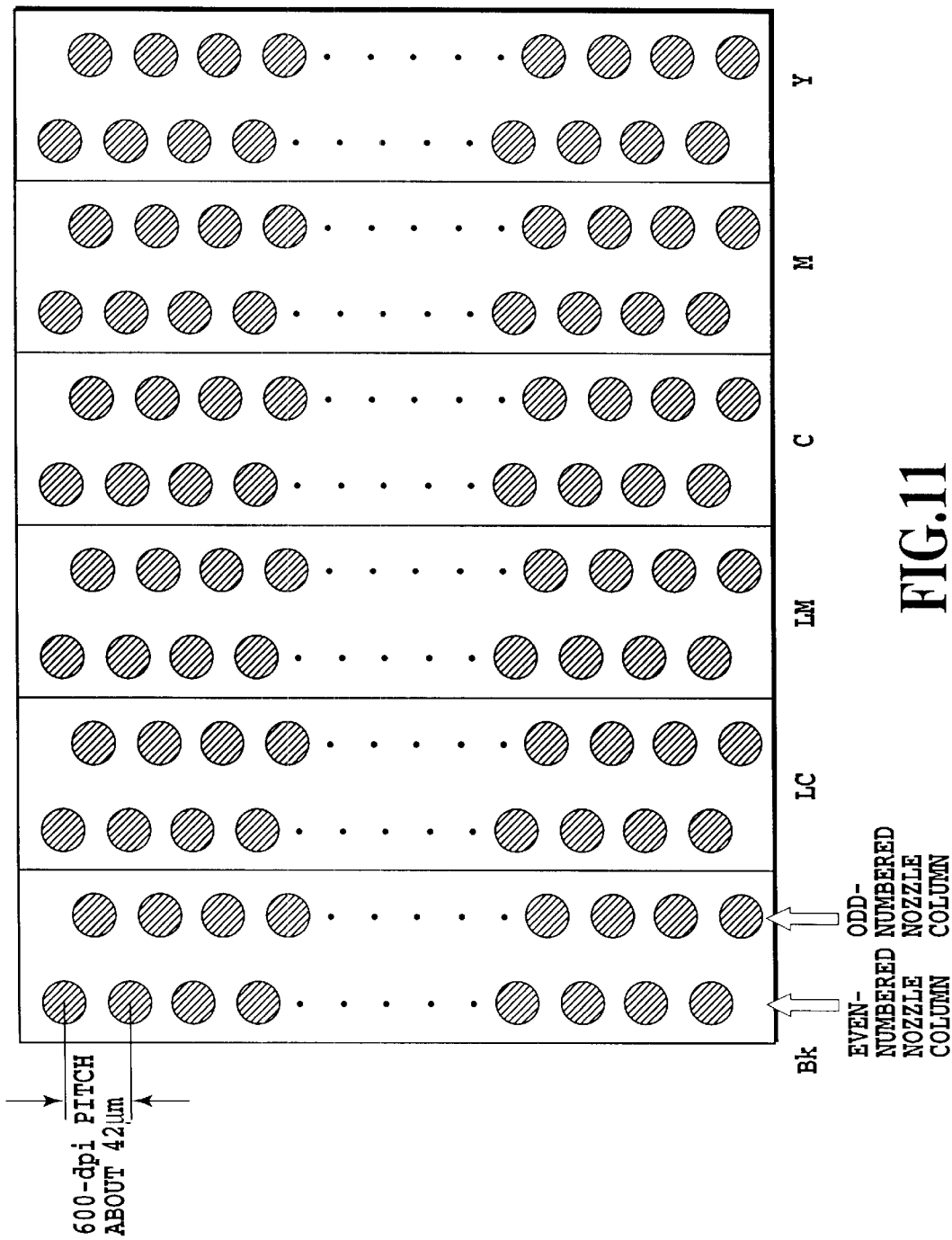
FIG. 11 is a schematic diagram showing an example of nozzle arrangement on the print head used in one embodiment of the present invention.

FIG. 11 is a schematic front view of the head used in this embodiment to realize high resolution printing. In this example, two parallel columns each having 128 nozzles are spaced from each other in the main scan direction (carriage scan direction) and staggered or shifted by about 21 $\mu$m from each other in the sub-scan direction (paper feed direction), with the 128 nozzles in each column arranged at a 600-DPI pitch (about 42 $\mu$m pitch). These two nozzle columns are used for each color and therefore a total of 256 nozzles are used to achieve a 1200 DPI resolution for each color. Further, in the example shown, the print head has 12 such nozzle columns integrally arranged side by side in the main scan direction to produce six colors with the 1200 DPI resolution. In the process of manufacture, the columns of two adjoining colors are fabricated simultaneously in one chip and then three such chips are bonded side by side. Hence, the nozzle columns of two adjoining colors in each chip (a set of black (Bk) and light cyan (LC), a set of light magenta (LM) and cyan (C) and a set of magenta (M) and yellow (Y)) have more similar driving conditions than other colors. With this construction, simply adjusting the ejection timings of the two adjoining colors can realize the 1200 DPI printing resolution.

7. Printing Method

A printing method for achieving the intended purpose of the present invention by using the printing apparatus and head of the constitution described above will be explained. The printing method may be reflected through the procedure shown in FIG. 10, particularly the printing operation (step S7).

In Japanese Patent Application Laid-open No. 5-31922 (1993) mentioned earlier, attention has been paid to the fact that color irregularity caused by the difference between the print-scanning directions depends on the ink covering ratios (swell-out ratios), and it was intended to make the covering ratio of ink landed on the paper in each scanning as even as possible. As a method therefor, m×n pieces of pixels were printed together by handling some adjoining dots printed in the same print-scanning as a collective dot. In the present invention also, the intention is equivalent to that in the above Application, to uniform the covering ratio. However, a method therefor is not to use a collective dot but to control the number of printing data in each print-scanning.

In the case of the head with 1200 DPI resolution shown in FIG. 11, one pixel has an area 21 $\mu$m square on the paper, but one drop used in this embodiment has about 4 pl and forms a circular dot of about a 45 $\mu$m diameter on the paper. In this case, one dot has an area of 1570 $\mu m^2$, and this is much larger than the one pixel area of 21×21=441 $\mu m^2$.

The multi-pass printing method was already explained by referring to FIGS. 21A to 21C and a constitution for completing an image by two multiple print-scanning (2 passes) was also explained, while multi-pass printing of eight passes is applied to the embodiment of the present invention. When multi-pass printing of about eight passes is carried out, color irregularity hardly occurs even if bi-directional printing is carried out on many printing media. However, color irregularity occurs on some kinds of printing media, and is strictly evaluated especially in a mode requiring a highest quality image.

According to the conventional method, printing data are equally divided in each print-scanning, therefore, printing is performed on a 12.5% duty for each pass in the case of 8-pass printing. Here, if the conventional random masking method is adopted, the ink covering ratio for the first pass becomes 12.5%×1570 $\mu m^2$/441 $\mu m^2$≈45%, which covers almost a half of the entire printing area on paper. Next, a 12.5% data equivalent to that in the first pass is printed in the second pass, but since the ink covering ratio becomes 45% of the remaining 55% (=100%−45%) of the entire printing area, i.e. about 25.0% (≈55×45/100), the ink covering ratio is largely reduced as a value for the same data printing ratio of 12.5%. Following this, the covering ratios are further reduced in the third pass and thereafter.

The inventors of the present invention paid attention to the fact that since the covering ratio reaches 45+25.0=70% in the first and second passes, namely, the first two multiple scanning, the prioritized color in the multi-pass (8-pass) printing is determined almost in the first two passes. In the case of bi-directional printing, the first pass and the second pass are reversed in the printing directions, therefore, if the first pass is forward printing, the first ink printed on the forward way is prioritized, and if the first pass is backward printing, the first ink printed on the backward way is prioritized, respectively. The third to eighth passes take part in the effect only to the remaining 30% blank area of the paper, and have almost nothing to do with color irregularity.

Namely, deterioration in image quality already occurs in the first two passes, in other words, if the color irregularity in these first two passes can be controlled, it is possible to remarkably reduce the harmful effect on the entire image caused by color irregularity.

While fixing the sum of the data printing ratios in the first and second passes to 12.5×2=25%, the inventors carried out an experiment so as to decrease the printing data in the first pass and increase that in the second pass by the decreased quantity in order to equalize both covering ratios in the first and second passes to each other. Since the covering ratio up to the second pass is 70% in the calculation, the data printing ratio in the first pass should be controlled so that the covering ratio becomes a half of it, namely, 35%. In this case, if inversely calculated, a data printing ratio is 35×441/1570=9.8%, therefore, the data printing ratio may be made to 10% in the first pass, and 25−10=15% in the second pass. However, it is assumed in this calculation that dots to be printed in a same printing pass are not adjacent to each other.

FIG. 12 shows evaluation results of color irregularity in the case of experiments carried out by varying the data printing ratios in the first and second passes by 1% steps. Although these are the results of the experiment using a printing medium on which color irregularity is easily noticeable, the color irregularity becomes almost insignificant with 9–10% data printing ratio in the first pass, and the result did not show any problem with 10%. This is an answer which almost coincides with the calculated value.

Figure 13:
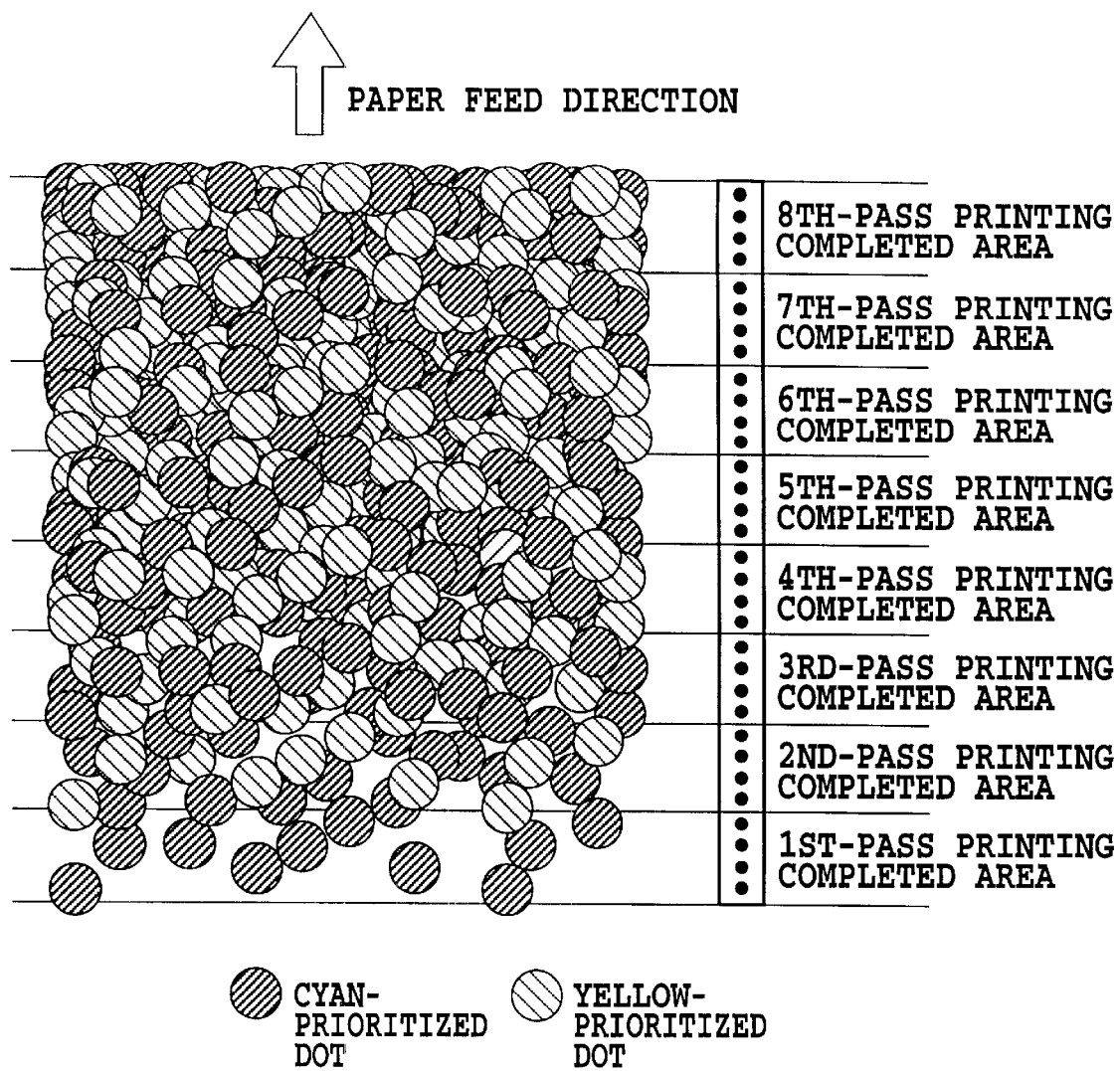
FIG. 13 is a schematic top view showing a state printed by 8-pass printing by applying the first embodiment of the present invention.

FIG. 13 illustrates the result of printing by 8-pass printing performed by applying the above-described contents. A printing head used for this embodiment has in practice 256 nozzles for each color as described above, however, for simplicity, an embodiment in which a green image composed of cyan and yellow is printed with 32 nozzles will be explained here.

Since this embodiment is of 8-pass printing, a total of 32 pixel areas printable by a single print-scanning are divided into printing areas with 4 pixels each, to complete an image by print-scanning at eight times concerning each printing area. In any image area, dots are printed firstly by the four nozzles for the first pass printing area. While 12.5% pixels in a printing area are printed on the forward way or the backward way in the commonly used 8-pass printing, the data printing ratio is reduced to 10% in the first pass printing area in this embodiment. FIG. 13 illustrates the state of a printed image at the time when print-scanning is ended for a forward way. In a first pass printing completed area, 10% pixels of the entire image data are dot-printed in cyan-prioritized color. The covering ratio is about 35% at this stage.

In the adjacent second pass printing completed area, 15% of pixel data are newly printed. In this area, about 10% of dots landed in the previous backward print-scanning are already printed, and these are yellow-prioritized dots. When the newly printed 15% of dots are overlapped with those precedently printed, the former sink behind the latter, and the first pass dot color is prioritized. As is evident from the results of the printing described up to here, the cyan-prioritized dots and the yellow-prioritized dots are evenly distributed about half-and-half, and also most of the image area is filled up with dots at the stage of the second pass printing and earlier.

12.5% of data are printed in each printing area of the third pass or hereafter, and a color to be prioritized sinks behind the back according to the above-described regularity. In the third pass and hereafter, the remaining 30% blank area is to be covered with dots, however, since most of the dots sink behind the back of the dots landed in the passes up to the second one, they hardly influence prioritized colors of a whole image, whichever the color to be prioritized is cyan or yellow.

In the embodiment in accordance with the present invention, eight multiple pass printing has been explained as an example, however, it is considered that the present invention is effective in the case of performing divided printing at least with four passes or more. The reason is that although, even 2-pass printing has of course a theoretical effect on color irregularity, another purpose of the divided printing, namely, the effects of eliminating unevenness of density caused by variation in nozzles and making stripes of connection inconspicuous can be obtained by equalizing data printing ratios in each print-scanning as much as possible. When the present invention is embodied in the 2-pass printing, most printing can hardly be performed in the first pass, but may be performed in the second pass. If so, the essential effects of the divided printing are offset.

In contrast with this, if multiple pass printing with about 8 passes is applied, even if an imbalance of the printing ratios occurs a little between the first pass and the second pass, no problem will arise as far as dots are equally divided in the remaining 6 passes. It is possible to give a meaning thereto that in the first and second passes, print-scanning is performed for reducing color irregularity, and in the third to eighth passes, print scanning is a countermeasure for eliminating unevenness in density and stripes of connection due to variation in nozzles, and from these improvements combined, a sufficient effect is expected to achieve a high quality photographic image. The effect of the present invention is significant in such a case as a dot area practically printed is larger than one pixel area as adopted in this embodiment.

Moreover, the more passes multiple pass printing uses, the more image quality is improved, while it takes more time for printing. Therefore, it is possible to change over a printing mode as necessary from 1-pass mode in which multiple pass printing is not performed, to one of 2 to 8 multiple pass modes, according to the kind of a printing medium and the purpose.

Moreover, a specification of a printing data ratio for each pass in practical printing operation can not only be provided as software of CPU E1001 (FIG. 8A) but also be provided beforehand as proper hardware, for example, a part of a circuit configuration such as ASIC E1006 (FIG. 8B).

For example, in FIG. 9, mask patterns for determining printing data ratios of each pass are stored beforehand in the development data buffer E2016 concerning selectable modes, and the print data development DMA controller E2015 manages the pass numbers according to the progress in printing operation, and it is thereby possible to mask the printing data developed in the print buffer E2014 with a mask pattern according to the number. These can be also applied to the embodiment described below.

8. Alternate Embodiments of the Invention

Next, the second embodiment of the present invention will be described. This embodiment adopts 4-pass printing, and a covering ratio is calculated by also adopting the effect of the collective dot mask described in the above-mentioned Japanese Patent Application Laid-open No. 6-22106 (1994).

Figure 14:
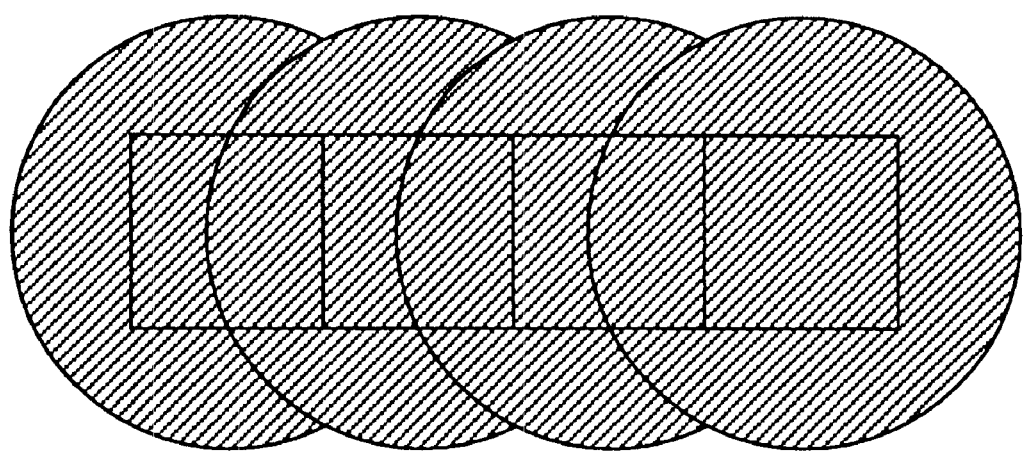
FIG. 14 illustrates a unit of collective dot used in the second embodiment of the present invention.

FIG. 14 shows a collective dot used in this embodiment, and printing is performed in pixel arrangement in a constitution unit of 4 dots in the main scanning direction×1 dot in the sub scanning direction. If it is assumed that plural dots adjoin each other like this, the overlapping areas of each dot are offset in the calculation of the covering ratio and thus, the covering ratio value becomes smaller. If a printing apparatus similar to the one used in the first embodiment is used also in this embodiment, the covering ratio of one collective dot is 64%. However, it is assumed here that each collective dot unit of m×n=4×1 does not adjoin each other. The first pass can be increased in the data printing ratio by the decrease in the covering ratio.

Since 4-pass printing is adopted in this embodiment adopts, the printing ratio is 25% in each print-scanning if data are equally divided. If printing is carried out by using the collective dot unit of 4×1 dots, the covering ratio is 64% in the first pass, and is 23% in the second pass. And the covering ratio up to the second pass reaches 87%, and color irregularity is decisive in the first two passes after all.

In order to equalize this covering ratio as done in the first embodiment, the data printing data ratio in the first pass is set to 16%, while that in the second pass to 34%.

Figure 15:
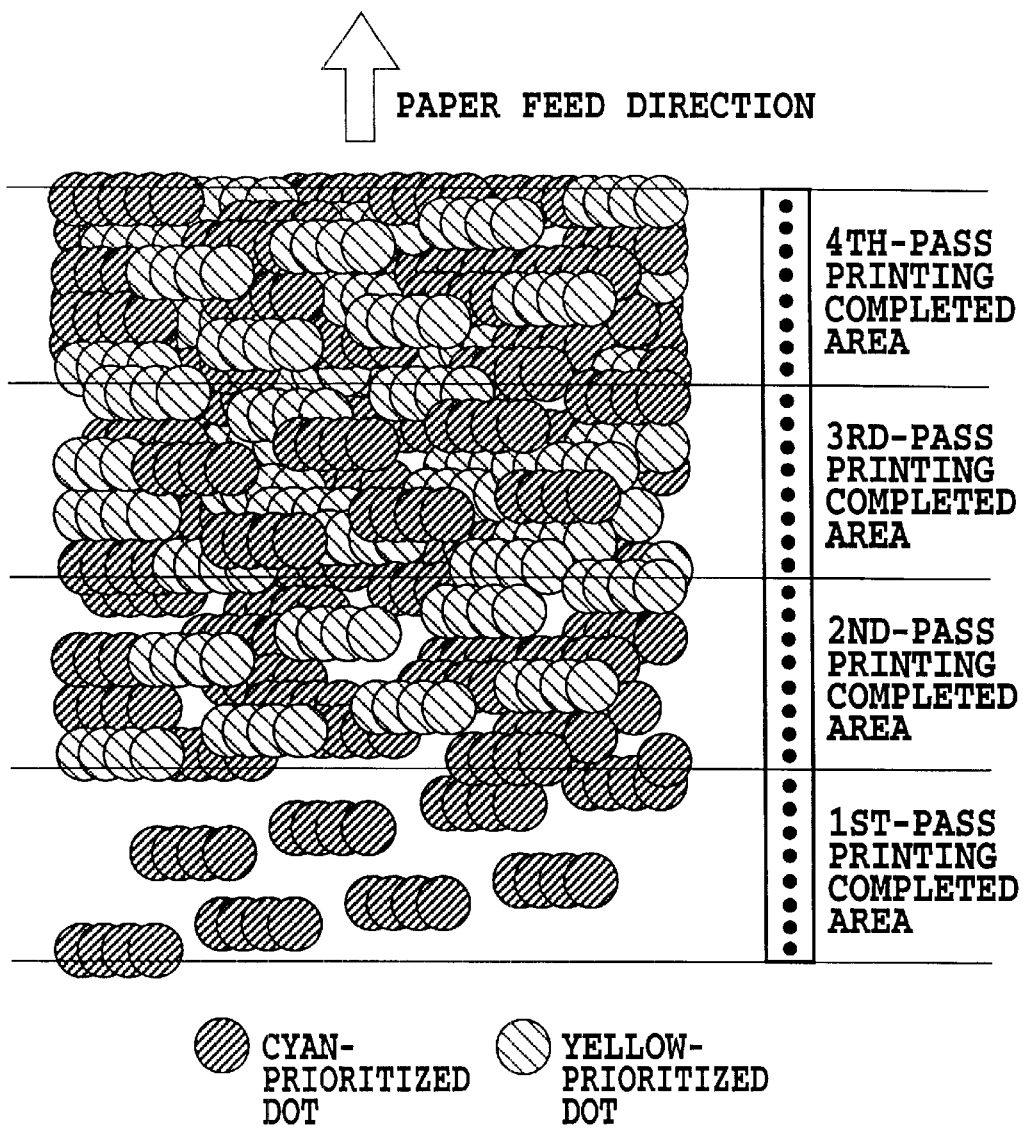
FIG. 15 is a schematic top view showing a state printed by 4-pass printing by applying the second embodiment of the present invention.
Figure 17:
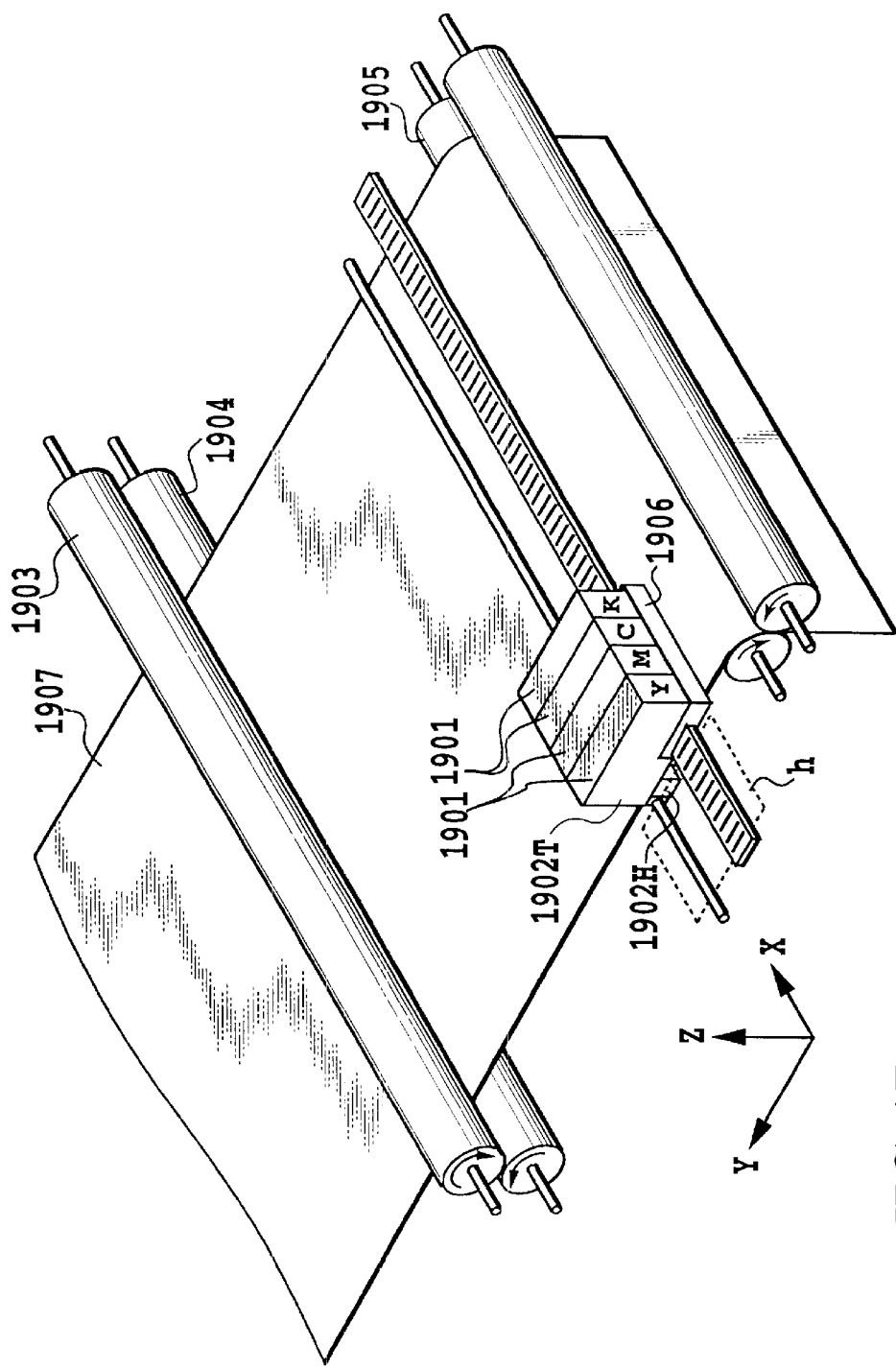
FIG. 17 is a perspective view showing simplified serial type color printer.
Figure 18:
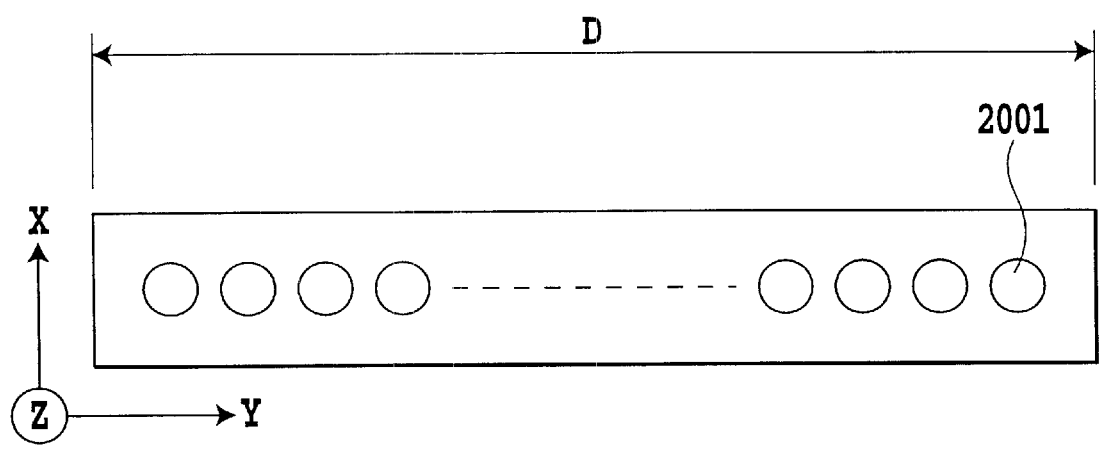
FIG. 18 schematically shows a nozzle arrangement of a print head applicable to the printer illustrated in FIG. 17.
Figure 22A:
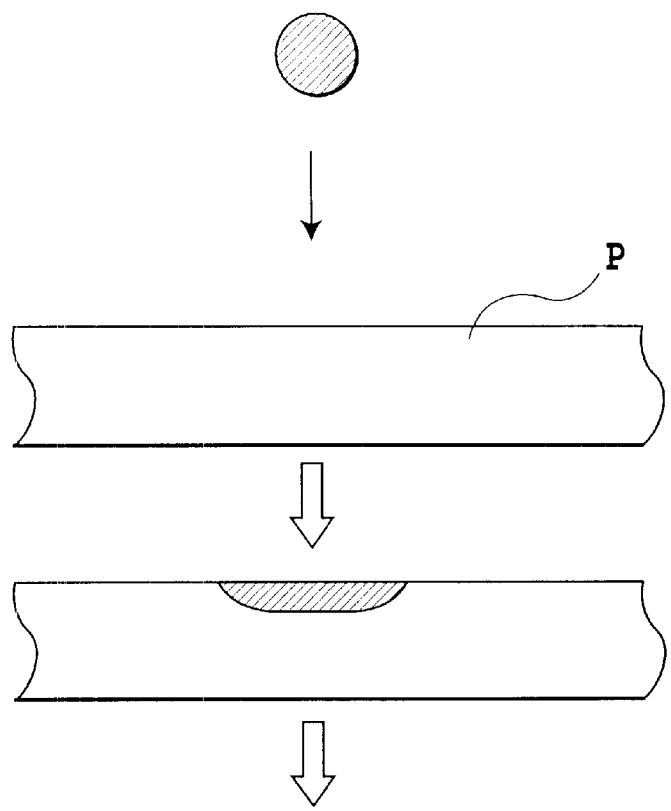
FIGS. 22A and 22B are illustrations explaining the case wherein two different color ink dots are absorbed (printed) at almost adjoining positions at a time interval.
Figure 22B:
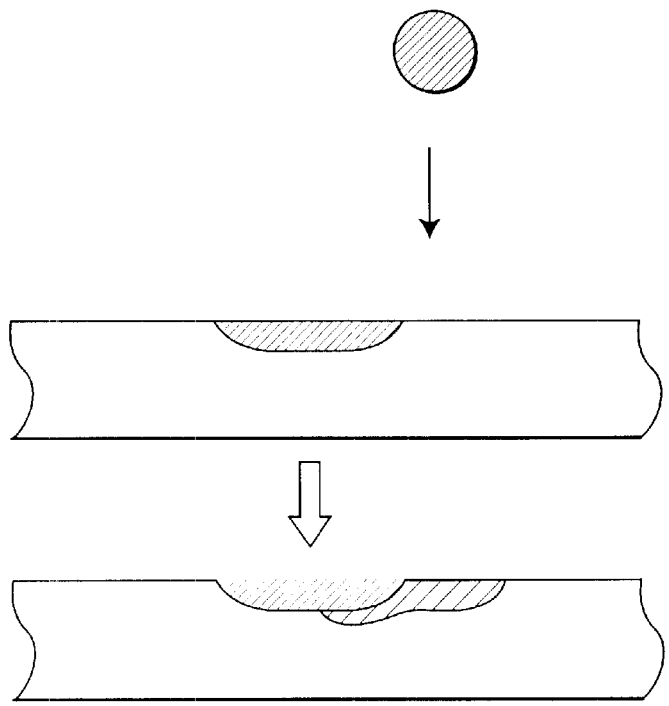
Figure 23A:
FIGS. 23A to 23C are illustrations explaining the states of ink penetration into the printing medium in. the case of carrying out bi-directional printing with the multi-pass printing method.
Figure 23B:
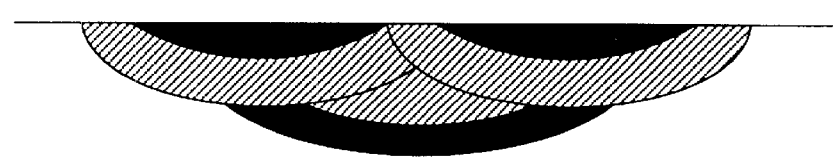
Figure 23C:
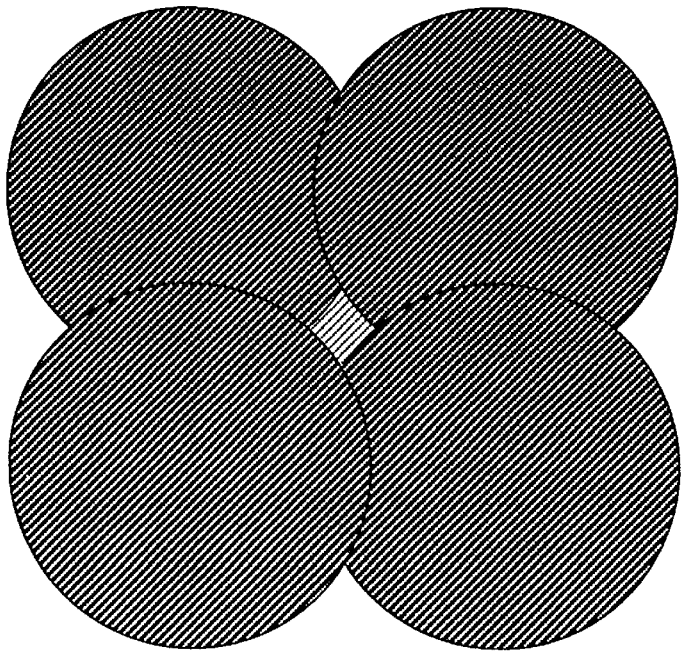
Figure 24:
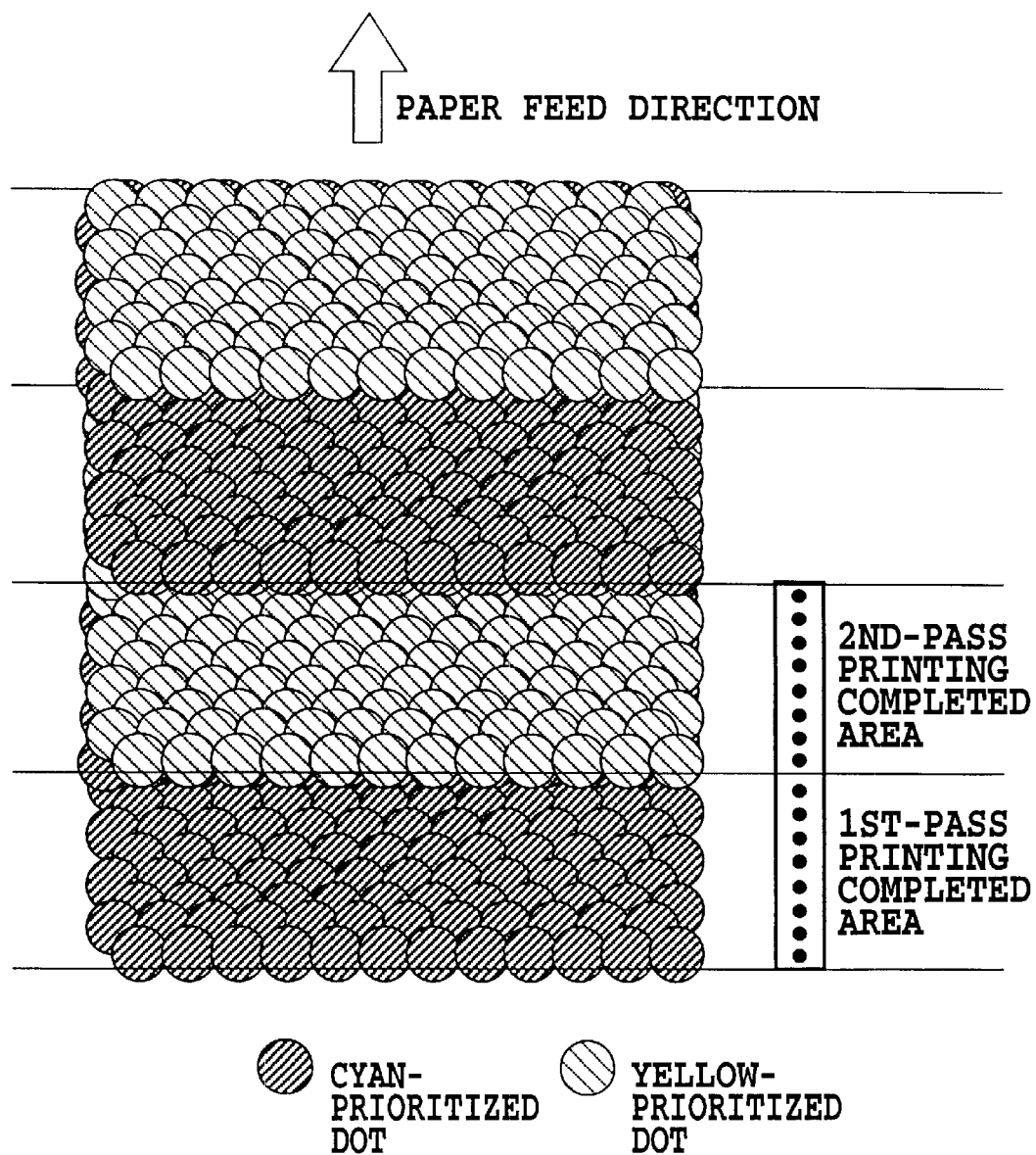
FIG. 24 is a schematic top view for explaining a state printed on a printing medium when the bi-directional printing is carried out with the multi-pass printing method.

FIG. 15 is a schematic view of the printing carried out according to this regularity. The head used in this embodiment is also shown in FIG. 11 as well as the one in the first embodiment. However, for simplicity also here, a state for printing a green image composed of cyan and yellow with 32 pieces of nozzles will be described below.

Since this embodiment is of 4-pass printing, a total of 32-pixel areas printable by a single print-scanning are divided into printing areas with 8 pixels each, to complete an image by print-scanning at four times concerning each printing area. In any image area, dots are printed firstly by the eight nozzles on the first pass printing area. While 25% pixels in a printing area are printed on the forward way or the backward way by the conventional 4-pass printing, the data printing ratio is reduced to 16% in the first pass printing area in this embodiment. FIG. 16 illustrates the state of a printed image at the time when print-scanning is ended for a forward way. In a first pass printing completed area, 16% pixels of the entire image data are printed in cyan-prioritized color. The covering ratio is about 44% at this stage.

In the adjoining second pass completed printing area, 34% of pixel data are newly printed. In this area, about 16% of dots landed in the previous backward print-scanning are already printed, and these are yellow-prioritized dots. When the newly printed 34% of dots are overlapped with those precedently printed, the former sink behind the latter, and the first pass dot color is prioritized. In the third pass printing area and hereafter, 25% of data are printed on each of them, and colors to be prioritized sink behind the backside according to the regularity as mentioned above.

As is evident from the results of this printing, most of the image areas are filled up with dots at the stage of the second pass printing and earlier. Therefore, it hardly influences prioritized colors of a whole image, whichever the color to be prioritized in the third pass area and thereafter is cyan or yellow. Thus, although a collective dot printing method is used as in a conventional embodiment, it becomes possible to realize bi-directional printing without color irregularity with the number of division smaller than 8-pass printing explained in the first embodiment.

FIG. 16 shows a relationship between each collective dot arrangement and data printing ratios when 4-pass printing is adopted and covering ratios are equalized in the first pass and second pass. If color irregularity is tried to be prevented from occurring only by the collective dot method with the data printing ratio in each print-scanning kept at 25%, the size of the collective dot becomes considerably large. On the contrary, the 4-pass printing is performed by controlling only the data printing ratio as in the first embodiment, the data printing ratio in the first pass becomes 14%, and a control effect of striped inconsistency tends to decrease.

In the photographic image quality realized by the present invention and this embodiment, the granular impression and the striped inconsistency is out of a resolution range recognizable by human eyes. In other words, a higher resolution does not need to be required. It is sufficient if the resolution is out of the visual resolution. As already described, by increasing the size of collective dot unit, a covering ratio can be set smaller, and further the multiple passes arranged for the purpose of preventing color irregularity from occurring can also be decreased in the number, therefore, it is effective from the view point of improving a throughput of printing. Namely, if the effects of the multi-pass printing can sufficiently be obtained by setting a data printing ratio properly, while a composition unit of dot concentration is set to a degree that is visually unrecognizable, bi-directional printing is possible without color irregularity and with the number of divided printing kept at the minimum.

Ease of conspicuousness of collective dot and color irregularity itself differs depending on the kinds of printing medium and printing image. Therefore, also in a printing mode for intending to form a high quality photographic image, it is possible to properly adjust the size of collective dot unit and a data printing ratio for each condition such as a printing medium.

Moreover, in FIG. 16, a mask for collective dot unit of 4×1 pixels is used for each print-scanning, however, such the mask for collective dot may be used only in the first pass (or odd-numbered passes), while using a random mask of one dot unit in the remaining three passes (or even-numbered passes). Only in the first pass (or odd-numbered passes in which a prioritized color appears), a covering area of printing dots has to be made small, and in the second pass or thereafter (or even numbered passes), the covering ratio is rather recommended to be set large. In such a manner, the collective dots actually printed are decreased in the number, and a whole image can be expected to be smoother.

Anyway, according to this embodiment, it has become possible to form a smooth image without color irregularity at a high speed by controlling the data printing ratios in the first and second passes and thereby carrying out bi-directional printing while using a mask for collective dot unit.

Moreover, it is possible to constitute a composite method adopting the methods in the first and second embodiments mentioned above as examples. Namely, for example, the method can be provided with an 8-pass mode (first mode) performing printing like that in the first embodiment and a 4-pass mode (second mode) using collective dot like that in the second embodiment. And, it becomes possible to properly obtain a desired printed material by changing over each mode in accordance with a user s desire, so that the modes can selectively be used, for example, by selecting the 8-pass mode in the case of giving priority to image quality, and selecting the 4-pass mode using the dot concentration in the case of giving priority to a printing speed.

Incidentally, one form of the head to which the present invention can be effectively applied is the one that utilizes thermal energy produced by an electrothermal transducer to cause film boiling in liquid thereby generating bubbles.

As explained above, in accordance with the present invention, it has become possible to print a smooth image without color irregularity at a high speed by setting a data printing ratio in the first pass in certain area smaller than that in the second pass and thereafter, in a multi-pass printing method (divided printing method), by which printing is carried out on the area by scanning at plural times with a print head.

What is claimed is:

1. A printing method using a print head on which a plurality of ejection openings for ejecting inks are arranged, said method comprising the steps of:

moving said print head to scan in forward and backward directions different from the arranging direction of said plurality of ejection openings, also relatively transporting said printing medium in the direction perpendicular to the scan directions by the quantities less than the arranging width of said plurality of ejection openings, and forming an image on the printing medium by the forward and backward scans at plural times in accordance with pixel arrangements in a complementary relation to the same image area; and making the sum of ratios of the data print quantity in the odd-numbered scans among said plural times of said forward and backward scans to the total data print quantity to said same image area, smaller than the sum of ratios of the data print quantity in the even-numbered scans among said plural times of said forward and backward scans, during said forming of image.

2. A printing method as claimed in claim 1, wherein said ratio of the data print quantity in a first scan is made smaller than said ratio of the data print quantity in a second scanning, among said plural times of said forward and backward scans.

3. A printing method as claimed in claim 1, wherein said scans are carried out three times or more to said same image area, and said ratio of the data print quantity in a third scan and thereafter is made larger than said ratio of the data print quantity in a first scan and smaller than said ratio of the data print quantity in a second scan.

4. A printing method as claimed in claim 3, wherein the sum of covering ratios of said printing medium by formed dots in said first scan and said second scans is made larger than 50%.

5. A printing method as claimed in claim 1, wherein said print head has plural arrays of said plurality of ejection openings side by side in said scan directions corresponding to inks with different color tones.

6. A printing method as claimed in claim 1, wherein said pixel arrangement in at least a first scanning among said plural times of said forward and backward scans is specified in a unit of m×n (n, m: integer) pixels.

7. A printing method as claimed in claim 1, wherein said print head has heating elements to generate thermal energy or causing film boiling in ink as an energy for ejecting ink from said ejection openings.

8. A printing method using a print head on which a plurality of ejection openings for ejecting inks are arranged, said method comprising the steps of:

moving said print head to scan in forward and backward directions different from the arranging direction of said plurality of ejection openings, also relatively transporting said printing medium in the direction perpendicular to the scan directions by the quantities less than the arranging width of said plurality of ejection openings, and forming an image on the printing medium by the forward and backward scans at plural times in accordance with pixel arrangements in a complementary relation to the same image area; and making a ratio of the data print quantity in a first scan among said plural times of said forward and backward scans to the total data print quantity to said same image area smaller than a ratio of the data print quantity in a second scanning, and making the sum of covering ratios of said printing medium by formed dots in said first scan and said second scans larger than 50%, during said forming of image.

9. A printing method as claimed in claim 8, wherein said covering ratios on said printing medium by formed dots in said first scan and said second scan are substantially equalized.

10. A printing method as claimed in claim 8, wherein said print head has heating elements to generate thermal energy for causing film boiling in ink as an energy for ejecting ink from said ejection openings.

11. A printing method using a print head on which a plurality of ejection openings for ejecting inks are arranged, said method comprising the steps of:

moving said print head to scan in forward and backward directions different from the arranging direction of said plurality of ejection openings, also relatively transporting said printing medium in the direction perpendicular to the scan directions by the quantities less than the arranging width of said plurality of ejection openings, and forming an image on the printing medium by the forward and backward scans at plural times in accordance with pixel arrangements in a complementary relation to the same image area;

a first control step of making the sum of ratios of the data print quantity in the odd-numbered scans among said plural times of said forward and backward scans to the total data print quantity to said same image area, smaller than the sum of ratios of the data print quantity in the even-numbered scans among said plural times of said forward and backward scans, during said forming of image; and a second control step of performing a control similar to said first control step except for making the number of said plural times of said forward and backward scans less than in said first control step, and also specifying the pixel arrangement at least in a first scan among said plural times of said forward and backward scans in a unit of m×n (n, m: integer) pixels.

12. A printing method as claimed in claim 11, wherein switching between said first and second control steps is possible.

13. A printing method as claimed in claim 11, wherein said print head has heating elements to generate thermal energy for causing film boiling in ink as an energy for ejecting ink from said ejection openings.

14. A printing apparatus using a print head on which a plurality of ejection openings for ejecting inks are arranged, said apparatus comprising:

means for moving said print head to scan in forward and backward directions different from the arranging direction of said plurality of ejection openings, also relatively transporting said printing medium in the direction perpendicular to the scan directions by the quantities less than the arranging width of said plurality of ejection openings, and forming an image on the printing medium by the forward and backward scans at plural times in accordance with pixel arrangements in a complementary relation to the same image area; and means for making the sum of ratios of the data print quantity in the odd-numbered scans among said plural times of said forward and backward scans to the total data print quantity to said same image area, smaller than the sum of ratios of the data print quantity in the even-numbered scans among said plural times of said forward and backward scans, during said forming of image.

15. A printing apparatus as claimed in claim 14, wherein said ratio of the data print quantity in a first scan is made smaller than said ratio of the data print quantity in a second scanning, among said plural times of said forward and backward scans.

16. A printing apparatus as claimed in claim 14, wherein said scans are carried out three times or more to said same image area, and said ratio of the data print quantity in a third scan and thereafter is made larger than said ratio of the data print quantity in a first scan and smaller than said ratio of the data print quantity in a second scan.

17. A printing apparatus as claimed in claim 16, wherein he sum of covering ratios of said printing medium by formed dots in said first scan and said second scans is made larger than 50%.

18. A printing apparatus as claimed in claim 14, wherein said print head has plural arrays of said plurality of ejection openings side by side in said scan directions corresponding to inks with different color tones.

19. A printing apparatus as claimed in claim 14, wherein said pixel arrangement in at least a first scanning among said plural times of said forward and backward scans is specified in a unit of m×n (n, m: integer) pixels.

20. A printing apparatus as claimed in claim 14, wherein said print head has heating elements to generate thermal energy for causing film boiling in ink as an energy for ejecting ink from said ejection openings.

21. A printing apparatus using a print head on which a plurality of ejection openings for ejecting inks are arranged, said apparatus comprising:

means for moving said print head to scan in forward and backward directions different from the arranging direction of said plurality of ejection openings, also relatively transporting said printing medium in the direction perpendicular to the scan directions by the quantities less than the arranging width of said plurality of ejection openings, and forming an image on the printing medium by the forward and backward scans at plural times in accordance with pixel arrangements in a complementary relation to the same image area; and means for making a ratio of the data print quantity in a first scan among said plural times of said forward and backward scans to the total data print quantity to said same image area smaller than a ratio of the data print quantity in a second scanning, and making the sum of covering ratios of said printing medium by formed dots in said first scan and said second scans larger than 50%, during said forming of image.

22. A printing apparatus as claimed in claim 21, wherein said covering ratios on said printing medium by formed dots in said first scan and said second scan are substantially equalized.

23. A printing apparatus as claimed in claim 21, wherein said print head has heating elements to generate thermal energy for causing film boiling in ink as an energy for ejecting ink from said ejection openings.

24. A printing apparatus using a print head on which a plurality of ejection openings for ejecting inks are arranged, said apparatus comprising:

means for moving said print head to scan in forward and backward directions different from the arranging direction of said plurality of ejection openings, also relatively transporting said printing medium in the direction perpendicular to the scan directions by the quantities less than the arranging width of said plurality of ejection openings, and forming an image on the printing medium by the forward and backward scans at plural times in accordance with pixel arrangements in a complementary relation to the same image area;

a first mode for making the sum of ratios of the data print quantity in the odd-numbered scans among said plural times of said forward and backward scans to the total data print quantity to said same image area, smaller than the sum of ratios of the data print quantity in the even-numbered scans among said plural times of said forward and backward scans, during said forming of image; and a second mode for performing a control similar to said first mode except for making the number of said plural times of said forward and backward scans less than in said first mode, and also specifying the pixel arrangement at least in a first scan among said plural times of said forward and backward scans in a unit of m×n (n, m: integer) pixels.

25. A printing apparatus as claimed in claim 24, switching between said first and second modes is possible.

26. A printing apparatus as claimed in claim 24, wherein said print head has heating elements to generate thermal energy for causing film boiling in ink as an energy for ejecting ink from said ejection openings.

* * * * *

UNITED STATES PATENT AND TRADEMARK OFFICE
CERTIFICATE OF CORRECTION

PATENT NO.     : 6,474,777 B1
DATED          : November 5, 2002
INVENTOR(S)    : Miyuki Fujita et al.

It is certified that error appears in the above-identified patent and that said Letters Patent is hereby corrected as shown below:

Title page,
Item [56], References Cited, FOREIGN PATENT DOCUMENTS,
"5031921 should read -- 5-031921
 5031922            5-031922
 6022106            6-022106
 7052390            7-052390 --.
Item [57], ABSTRACT,
Line 12, "a" should read -- the --; and
Line 15, "reduced," should read -- be reduced, --.

Column 1,
Line 33, "to." should read -- to --.

Column 2,
Line 12, "a —X" should read -- the X --; and
Line 66, "pixels." should read -- pixels, --.

Column 3,
Line 26, "arrangement." should read -- arrangement --; and
Line 32, "synchronized" should read -- synchronize --.

Column 4,
Line 15, "characteristic" should read -- characteristics --.

Column 5,
Lines 24 and 27, "about" should read -- the --; and
Line 36, "are" should read -- is --.

Column 6,
Line 17, "does" should read -- do --;
Line 26, "above." should read -- above --;
Line 32, "width." should read -- width, --; and
Line 62, "consist" should read -- consists --.

Column 10,
Line 39, "showing" should read -- showing a --; and
Line 56, "in." should read -- in --.

Column 11,
Line 1, "example" should read -- example of --; and
Line 49, "1004a," should read -- M1004a, --.

UNITED STATES PATENT AND TRADEMARK OFFICE
CERTIFICATE OF CORRECTION

PATENT NO. : 6,474,777 B1  
DATED : November 5, 2002  
INVENTOR(S) : Miyuki Fujita et al.

It is certified that error appears in the above-identified patent and that said Letters Patent is hereby corrected as shown below:

Column 12,
Line 55, "bonded." should read -- bonded --.

Column 13,
Line 48, "combine" should read -- are combined --.

Column 17,
Line 11, "receive" (both occurrences) should read -- received --;
Lines 14 and 25, "trasmit" should read -- transmitted --; and
Line 21, "receive" should read -- received --.

Column 18,
Line 14, "DMA-transfers" should read -- DMA transfers --.

Column 19,
Line 60, "of f" should read -- off --.

Column 23,
Line 35, "adopts," should be deleted; and
Line 43, "that in the second pass" should read -- the second pass is set --.

Column 24,
Line 51, "the" should read -- a --.

Column 25,
Line 8, "user s" should read -- user's --; and
Line 60, "scans" should read -- scan --.

Column 26,
Line 5, "or" should read -- for --.

UNITED STATES PATENT AND TRADEMARK OFFICE
CERTIFICATE OF CORRECTION

PATENT NO. : 6,474,777 B1
DATED : November 5, 2002
INVENTOR(S) : Miyuki Fujita et al.

It is certified that error appears in the above-identified patent and that said Letters Patent is hereby corrected as shown below:

Column 27,
Line 38, "be" should read -- the --.

Column 28,
Line 52, "switching" should read -- wherein switching --.

Signed and Sealed this

Nineteenth Day of August, 2003

JAMES E. ROGAN
*Director of the United States Patent and Trademark Office*